(12) United States Patent
Montesanti et al.

(10) Patent No.: US 7,275,468 B2
(45) Date of Patent: Oct. 2, 2007

(54) ROTARY FAST TOOL SERVO SYSTEM AND METHODS

(75) Inventors: Richard C. Montesanti, Cambridge, MA (US); David L. Trumper, Plaistow, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 403 days.

(21) Appl. No.: 10/448,336

(22) Filed: May 29, 2003

(65) Prior Publication Data

US 2004/0035266 A1 Feb. 26, 2004

Related U.S. Application Data

(60) Provisional application No. 60/383,956, filed on May 29, 2002.

(51) Int. Cl.
*B23B 29/16* (2006.01)

(52) U.S. Cl. .............................. 82/1.11; 82/157; 82/158

(58) Field of Classification Search ............... 82/1.1, 82/157, 158, 162, 164, 170; 384/45; 407/102
See application file for complete search history.

(56) References Cited

U.S. PATENT DOCUMENTS

| | | | | |
|---|---|---|---|---|
| 2,323,324 A | * | 7/1943 | Hanson | 82/157 |
| 2,746,332 A | * | 5/1956 | Smith | 82/157 |
| 4,373,404 A | | 2/1983 | Heinz | 74/424.8 B |
| 4,428,704 A | | 1/1984 | Kolokhe | 408/156 |
| 4,528,533 A | | 7/1985 | Montagu | 335/230 |
| 4,590,828 A | | 5/1986 | Sullivan | 82/24 R |
| 4,634,191 A | | 1/1987 | Studer | 310/90.5 |
| 4,797,039 A | | 1/1989 | Bosek | 407/87 |
| 4,813,829 A | | 3/1989 | Koppelmann | 409/136 |

(Continued)

FOREIGN PATENT DOCUMENTS

DE 41 13 667 4/1991

(Continued)

OTHER PUBLICATIONS

International Search Report Dated Feb. 10, 2005.

(Continued)

*Primary Examiner*—Willmon Fridie, Jr.
(74) *Attorney, Agent, or Firm*—Peter A. Nieves; Sheehan, Phinney, Bass + Green, P.A.

(57) ABSTRACT

A high bandwidth rotary fast tool servo provides tool motion in a direction nominally parallel to the surface-normal of a workpiece at the point of contact between the cutting tool and workpiece. Three or more flexure blades having all ends fixed are used to form an axis of rotation for a swing arm that carries a cutting tool at a set radius from the axis of rotation. An actuator rotates a swing arm assembly such that a cutting tool is moved in and away from the lathe-mounted, rotating workpiece in a rapid and controlled manner in order to machine the workpiece. A pair of position sensors provides rotation and position information for a swing arm to a control system. A control system commands and coordinates motion of the fast tool servo with the motion of a spindle, rotating table, cross-feed slide, and in-feed slide of a precision lathe.

68 Claims, 34 Drawing Sheets

U.S. PATENT DOCUMENTS

| | | | | |
|---|---|---|---|---|
| 4,878,787 | A | 11/1989 | Hunt | 408/181 |
| 4,986,151 | A * | 1/1991 | Horn | 82/157 |
| 4,987,526 | A | 1/1991 | Slocum et al. | 364/167.01 |
| 5,196,745 | A | 3/1993 | Trumper | 310/12 |
| 5,294,854 | A | 3/1994 | Trumper | 310/90.5 |
| 5,417,130 | A | 5/1995 | Dorsch | 82/1.11 |
| 5,467,675 | A | 11/1995 | Dow et al. | 82/1.11 |
| 5,625,267 | A | 4/1997 | Gregory | 318/625 |
| 5,631,618 | A | 5/1997 | Trumper et al. | 335/299 |
| 5,647,321 | A | 7/1997 | Ichikawa et al. | 123/399 |
| 5,699,621 | A | 12/1997 | Trumper et al. | 33/1 M |
| 5,718,154 | A | 2/1998 | Council, Jr. | 82/1.11 |
| 5,719,543 | A | 2/1998 | Berling | 335/229 |
| 5,809,855 | A * | 9/1998 | Francia | 82/157 |
| 5,823,720 | A | 10/1998 | Moore | 408/204 |
| 5,825,112 | A | 10/1998 | Lipo et al. | 310/181 |
| 6,062,778 | A | 5/2000 | Szuba et al. | 408/156 |
| 6,092,447 | A * | 7/2000 | Schlitters | 82/157 |
| 6,170,367 | B1 | 1/2001 | Keller et al. | 82/1.11 |
| 6,237,452 | B1 | 5/2001 | Ludwick et al. | 82/12 |
| 6,323,483 | B1 | 11/2001 | Cleveland et al. | 250/306 |
| 6,356,391 | B1 | 3/2002 | Gardiner et al. | 359/628 |
| 6,457,379 | B1 | 10/2002 | Mirone | 74/552 |
| 6,523,443 | B1 | 2/2003 | Hof et al. | 82/1.4 |
| 7,089,835 | B2 * | 8/2006 | Bryan | 82/1.11 |
| 2002/0036748 | A1 | 3/2002 | Chapoy et al. | 351/160 R |
| 2002/0057497 | A1 | 5/2002 | Gardiner et al. | 359/625 |
| 2002/0057564 | A1 | 5/2002 | Campbell et al. | 362/31 |

FOREIGN PATENT DOCUMENTS

| | | |
|---|---|---|
| EP | 0 354 639 | 2/1990 |
| EP | 0 439 425 B1 | 4/1993 |
| EP | 0 786 309 | 7/1997 |
| EP | 0 786 309 B1 | 7/1997 |
| JP | 11-309646 | 4/1998 |
| SU | 914188 | 5/1980 |
| SU | 984794 | 7/1980 |
| WO | 03/101666 | 12/2003 |

OTHER PUBLICATIONS

Rivin, E.I., "Properties and Prospective Applications of Ultra Thin Layered Rubber-Metal Laminates for Limited Travel Bearings," *Tribology Int.* 1983, vol. 18, No. 1.

Davidsson, P., et al, "A new symmetric scanning tunneling microscope design," J. Vac. Sci, Technol. A 6(2), Mar./Apr. 1988 p. 380-382.

Goto, T., et al, "Development of a Rotary Fast Tool Servo for Ultraprecision Grinding of Silicon Wafer," Proc. of 2$^{nd}$ euspen International Conference, Turin, Italy, May 27-31, 2001, p. 790-793.

Gutierrez, H., et al, "Fabrication of Non-Rotationally Symmetric Surfaces Using a Magnetically Levitated Fast-Tool Servo," http://airy.pec.ncsu.edu/PEC/publications/annual_reports/actuation/1997/97gutierrez.html, Abstract only, Oct. 21, 2002.

Hameyer, K. & Nienhaus M., "Electromagnetic Actuators—Current Developments and examples," Paper presented at the 8$^{th}$ International Conference on New Actuators—Actuator 2002, Bremen, Germany (Jun. 2002).

McKinney, M., "The many facets of diamond turning," Laser Focus World, Oct. 2001.

"Machining a Biconic Mirror," http://airy.pec.ncsu.edu/PEC/research/projects/biconic/index.html, Abstract only, Oct. 21, 2002.

Popham, V. W., et al., "Variable Gap-Reluctance Linear Motor with Application to Linear Resonance Compressors," ASME, New York, Nov. 11-16, 2001.

"Rotary Fast-Tool Servo for Diamond Turning of Asymmetric Optics," http://web.mit.edu/pmc/www/Newprojects/FastTool/fasttool.html, Oct. 21, 2002.

* cited by examiner

ROTARY FAST TOOL SERVO SYSTEM AND METHODS

CROSS REFERENCES TO RELATED APPLICATIONS

This application claims the benefit of U.S. Provisional Application No. 60/383,956, filed on May 29, 2002. The entire contents of the above application are incorporated herein by reference.

GOVERNMENT SUPPORT

This invention was supported, in whole or in part, by Lawrence Livermore National Laboratory, Subcontract No. B516163, under Grant No. W-7405-ENG-48, from the U.S. Department of Energy. The Government has certain rights in the invention.

BACKGROUND OF THE INVENTION

A fast tool servo is a well-known device that can be added to a new or existing machine tool to provide an additional axis of motion between the cutting tool and a workpiece. A fast tool servo most notably distinguishes itself by its ability to move the tool at a much higher bandwidth, that is at a high speed of controlled, repetitive motion, on its axis relative to the other machine tool axes, with accuracy equal to or better than that of the other tool axes. Fast tool servos fall into two broad categories: rotary and linear. A rotary fast tool servo produces relative motion between the cutting tool and a workpiece by rotation of a swing arm that carries the tool at a fixed radius from the axis of rotation. A linear fast tool servo produces relative motion between the cutting tool and a workpiece by producing a linear translation of the tool.

A rotary fast tool servo is preferred in certain precision machining applications that are intolerant to the reaction force developed by a linear fast tool servo. For instance, in an application where it is desired to produce a textured surface on a spherical-shaped workpiece a fast tool servo is mounted on a rotary table that allows the tool to engage the workpiece, which is mounted to a spindle, at all points from its "pole" to its "equator". A rotary-type mechanism oriented with its rotation axis parallel to the rotary table generates a reaction torque on the rotary table, which can be allowed to float as a reaction mass or be locked and allowed to transmit the torque to the machine structure. In the later case the machine structure experiences a disturbance torque whose value does not depend on the angle of the rotary table. In contrast, a linear fast tool servo generates a reaction force on the rotary table. This is generally not a problem when the rotary table is positioned so that the reaction force is parallel to the direction of travel of the slide carrying the rotary table. However, when the rotary table is positioned so that a component of the reaction force is perpendicular to the direction of travel of that slide, that force component is transmitted by the slide to the machine structure as a disturbance. To the extent that the tool/workpiece interaction is affected by disturbances to the machine structure, a linear fast tool servo will produce errors in the desired surface texture as a function of "latitude" on a spherical workpiece.

Current fast tool servo technology does not support sufficient bandwidth to meet certain manufacturing goals and is also not sufficiently fast to machine certain types of materials, for example, some plastics, properly. It is desirable to have a method and apparatus for a rotary fast tool servo having a higher bandwidth than currently available systems.

SUMMARY OF THE INVENTION

The present invention is directed to a rotary fast tool servo system that improves the accuracy and speed to enable and meet manufacturing goals for, for example, fabricating three-dimensional surface features. The embodiments of the present invention provide a high level of bandwidth and precision control to form short spatial wavelength features, for example, 50 micron long features with 5 micron peak to valley dimensions at 10 kHz or more. In a preferred embodiment, the rotary fast tool servo system includes a cutting element mounted to a rotating arm that is driven by an actuator. The arm is mounted to the fast tool servo base by flexures on at least one side of the cutting element. Each flexure preferably includes orthogonally positioned flexure elements that extend from the rotating arm to the base. The rotating arm can be oriented vertically, horizontally, or in any other desired orientation. The flexures serve to guide movement of the tool during cutting. The workpiece can be mounted on the spindle of a precision lathe which can rotate the workpiece during operation.

In a preferred embodiment, the system has an additional actuator to adjust the tool position relative to the workpiece and can employ coarse and fine adjustments. Sensors can be used to measure position, displacement and/or rotation of system elements and provide feedback control signals. Damping elements can be added to adjust the dynamic performance for certain applications.

The embodiments of the present invention relate to a system for a high bandwidth rotary fast tool servo, and in a preferred embodiment provides tool motion in a direction nominally parallel to the surface-normal of a workpiece at the point of contact between the cutting tool and workpiece. In one embodiment, the invention provides ±25 microns of tool motion with ±0.025 micron (±25 nm) of accuracy when operating at a frequency of at least 2000 Hz, while producing negligible reaction forces and torques on the machine tool that the fast tool servo is attached to. The fast tool servo device of the present invention can achieve a bandwidth of at least approximately two to ten times that of current commercially available systems. Consequently, the embodiments of the present invention can increase production rates by at least two to ten times in manufacturing processes that utilize fast tool servos.

A preferred embodiment of the present invention includes a high bandwidth rotary fast tool servo device, having a base, a cutting tool, a rotatable swing arm to hold the cutting tool at a fixed radius from an axis of rotation, and at least three flexures attached to the swing arm and extending radially from the swing arm relative to the base, the flexures being positioned such that rotation of the rotatable arm flexes the flexures. The first, the second and the third flexures have an angular separation from each other and support the rotatable swing arm in the base and establish an axis of rotation for the swing arm.

The device further includes a fourth flexure attached to the swing arm and extending radially from the swing arm relative to the base, the fourth flexure can be co-linear with one of the other flexures. In an alternate preferred embodiment, a pair of flexures can be co-linear and can be formed from a single blade. The device also includes the swing arm being driven by an actuator. A controller is included in the device.

In accordance with another aspect of the invention, a method of machining a part from a workpiece includes the steps of rotating a workpiece on a spindle, providing a cutting tool carried by a swing arm and offset from a rotational axis of the swing arm, supporting the swing arm and establishing a rotation axis for the swing arm with a plurality of flexures wherein both ends of the flexures are substantially fixed, rotating the swing arm for moving the cutting tool into and out of engagement with the workpiece and establishing relative motion between the workpiece and the cutting tool to form the part. In alternate embodiments, either the workpiece or the rotational axis of the swing arm carrying a cutting tool can be stationary while the other moves in a plane relative to the stationary piece. In an embodiment both the workpiece and the cutting tool can travel along at least two axes.

The method of machining includes rotating the workpiece at a speed in excess of 300 revolutions per minute. Further, the workpiece can rotate in a range of between 10 and 10,000 revolutions per minute. The method of machining includes the actuator moving the swing arm at a frequency of at least 1500 cycles per second. The cutting tool can have a full stroke length of 5 microns or a stroke length of ±2.5 microns for a rotation frequency of approximately 2 kHz, for example. A full stroke length of 50 microns or a stroke length of ±25 microns can be achieved in a preferred embodiment.

In accordance with another aspect of the invention, a method of controlling relative motion between a workpiece and a cutting tool of a fast tool servo includes the steps of providing a machine tool with a cross-slide and an in-feed slide, determining with at least one sensor the rotation of a workpiece spindle of the machine and the workpiece carried by the workpiece spindle, determining with at least one sensor the position of the cross-slide of the machine, determining with at least one sensor the position of the in-feed slide of the machine, determining with at least one sensor the position of a cutting edge carried by a swing arm of the fast tool servo relative to the portion of a machine tool that the fast tool servo is attached to, and moving the machine tool with the workpiece and the cutting edge of the fast tool servo relative to each other to form a part. The method further includes the steps of providing a base unit of the machine tool for holding the rotatable spindle, determining the position of the base unit, the base unit movable in at least one of an in-slide or cross-slide directions; and providing the position of the base unit and the rotational position of the workpiece spindle to a precision lathe controller and servo controller. The method can also include the steps of determining with at least one sensor the rotational position of the swing arm, and providing the position of the swing arm to a fast tool servo controller. The method further includes the steps of synthesizing angular velocity of the swing arm from the position sensor, providing additional sensors associated with one of the swing arm and the actuator, and providing information from the additional sensors to the fast tool servo controller to determine the exact position and the rotation of the swing arm.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
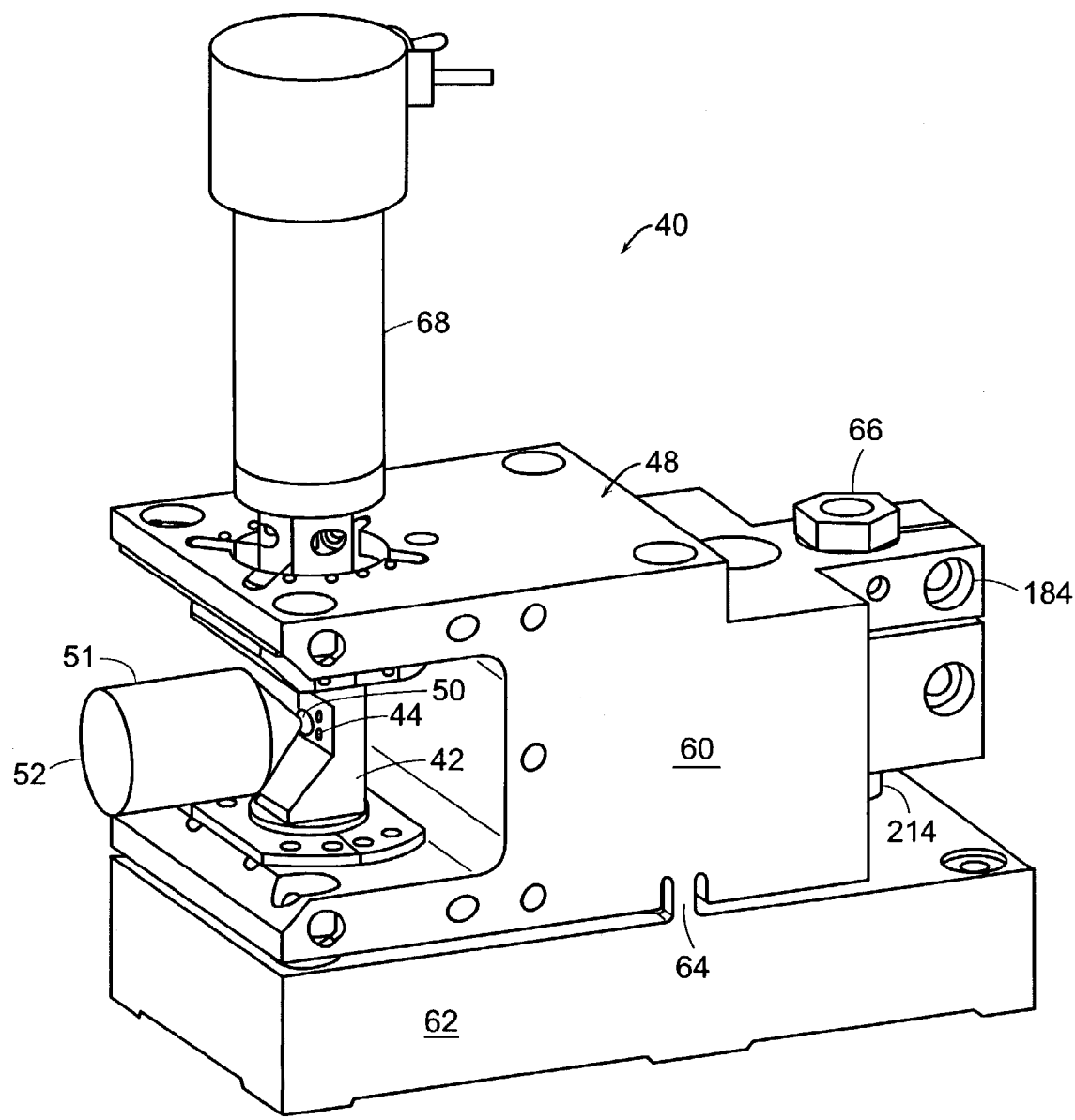
FIG. 1 is an isometric projection of the rotary fast tool servo assembly in accordance with a preferred embodiment of the present invention.

Referring to the drawings in detail, a high bandwidth rotary fast tool servo system is illustrated in accordance with a preferred embodiment of the present invention designated generally as 40. In a preferred embodiment, the high bandwidth rotary fast tool servo provides tool motion in a direction nominally parallel to the surface-normal of a workpiece at the point of contact between the cutting tool and workpiece.

Figure 5:
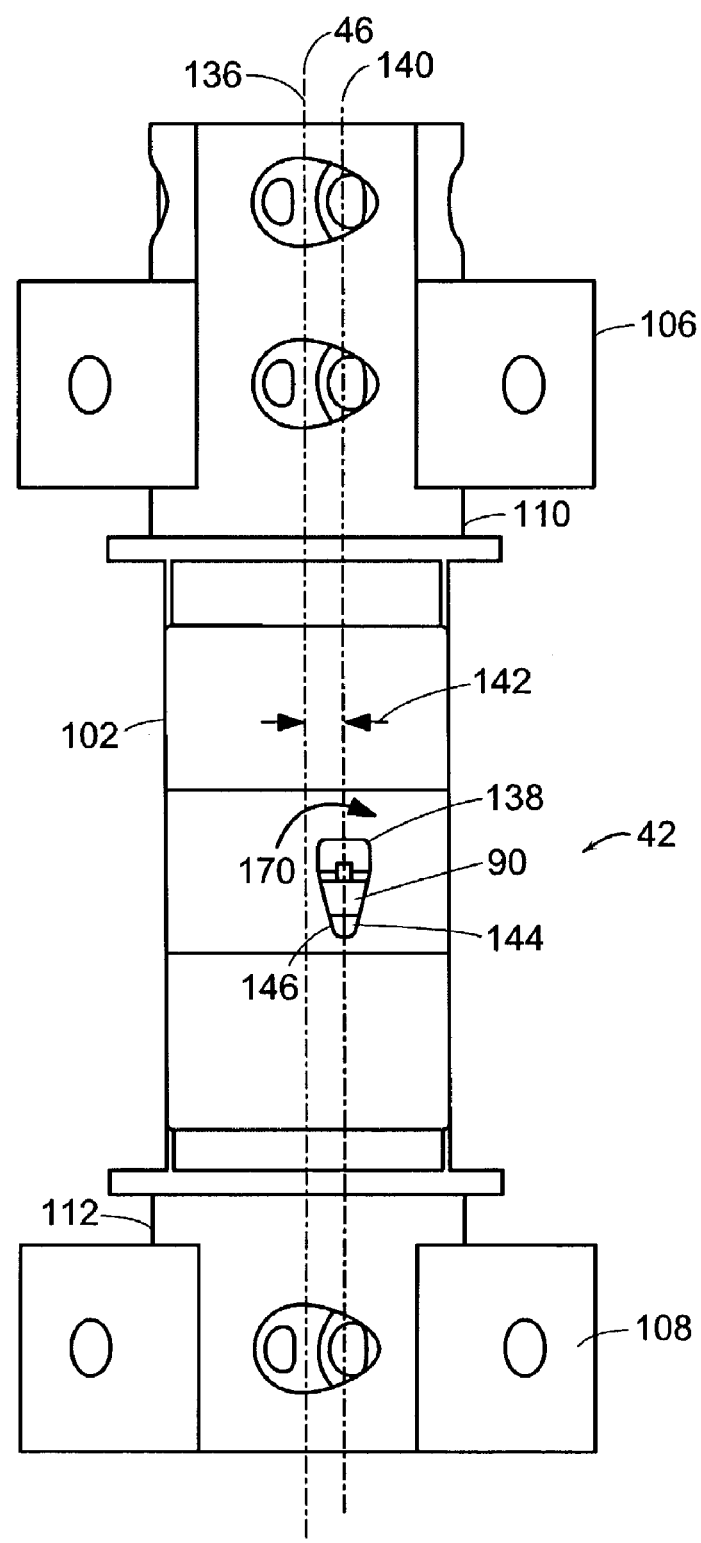
FIG. 5 is a front view sketch of the swing arm assembly of FIG. 4.

FIG. 1 shows the high bandwidth rotary fast tool servo 40 having a swing arm assembly 42 holding a cutting tool 44 to machine a workpiece 50. The cutting tool 44 is offset from the axis of rotation 46, as best seen in FIG. 5, of the swing arm assembly 42. The workpiece 50 is held typically by a workpiece holder 51 that attaches to a lathe spindle at surface 52. The swing arm assembly 42 is supported in a base 48 having an upper portion 60 and a lower portion 62. The upper portion 60 and lower portion 62 are connected by a flexure hinge 64. The upper portion 60 of the base 48 has a differential screw assembly 66. An actuator 68 is connected to the top of the swing arm assembly 42.

In operation, the actuator 68 rotates the swing arm assembly 42 such that the cutting tool 44 is moved into and away from the lathe-mounted, rotating workpiece 50 in a rapid and controlled manner in order to machine the workpiece. In an alternate embodiment the swing arm assembly 42 and the moving member of the actuator 68 are integrated and are one and the same and carry the cutting tool 44. The differential screw assembly 66 together with the flexure hinge 64 provide accurate cutting tool positioning in a direction nominally tangent to the surface-normal of a workpiece at the point of contact between the cutting tool and workpiece and nominally parallel to the axis of rotation of the swing arm assembly by enabling the upper portion 60 of the base 48 to be repositioned in a fine-grained manner with respect to the lower portion 62 of the base 48.

Figure 2A:
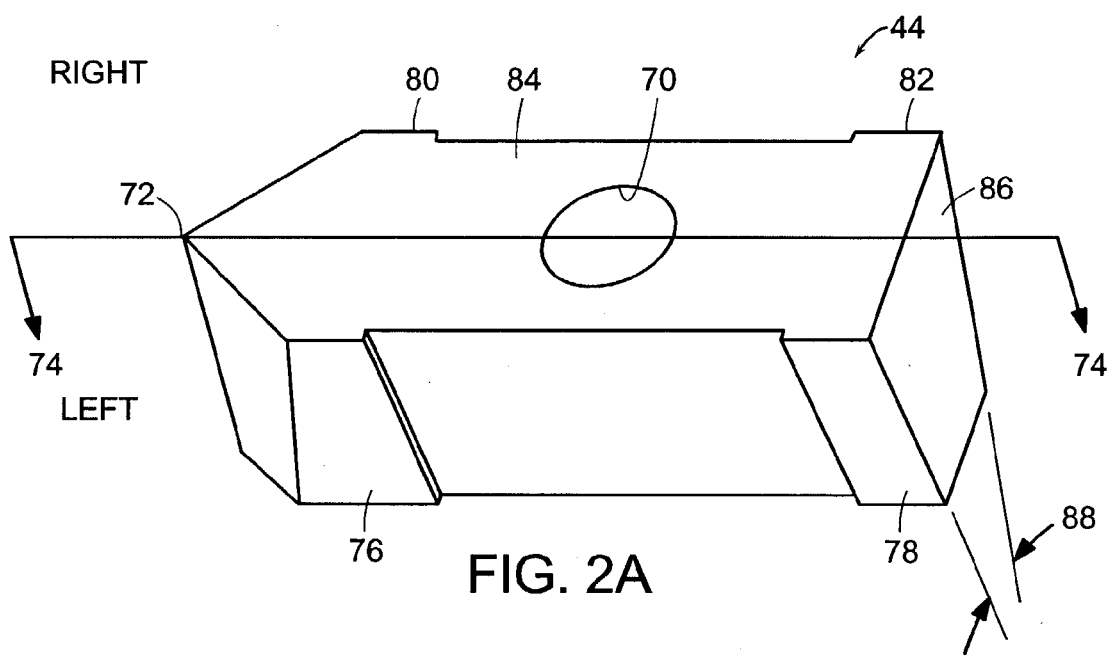
FIG. 2A is an isometric projection of a cutting tool according to principles of the preferred embodiments of the present invention.

FIG. 2A shows a first embodiment of the cutting tool according to principles of the present invention. The cutting tool 44 has a threaded hole 70, a cutting edge 72, a right/left plane of symmetry 74 that divides the tool into right and left halves, a left first mating surface 76 and a left second mating surface 78, a right first mating surface 80 and a right second mating surface 82, a top surface 84, and a back surface 86. The left first and second mating surfaces 76 and 78 and the right first and second mating surfaces 80 and 82 form a taper angle 88 bisected by the right/left plan of symmetry 74. The left first and second mating surfaces 76 and 78 and the right first and second mating surfaces 80 and 82 mate with the swing arm 102 of the swing arm assembly 42 as described hereinafter with respect to FIG. 5. The threaded hole 70 is substantially parallel to and nominally centered on the plane of symmetry 74.

In one preferred embodiment, the cutting edge 72 is a diamond. Alternatives for the cutting edge 72 can be various materials including cubic boron nitride, tungsten carbide, high speed steel, and other materials used for precision machining metals, plastics, ceramics, glasses and foams.

Figure 2B:
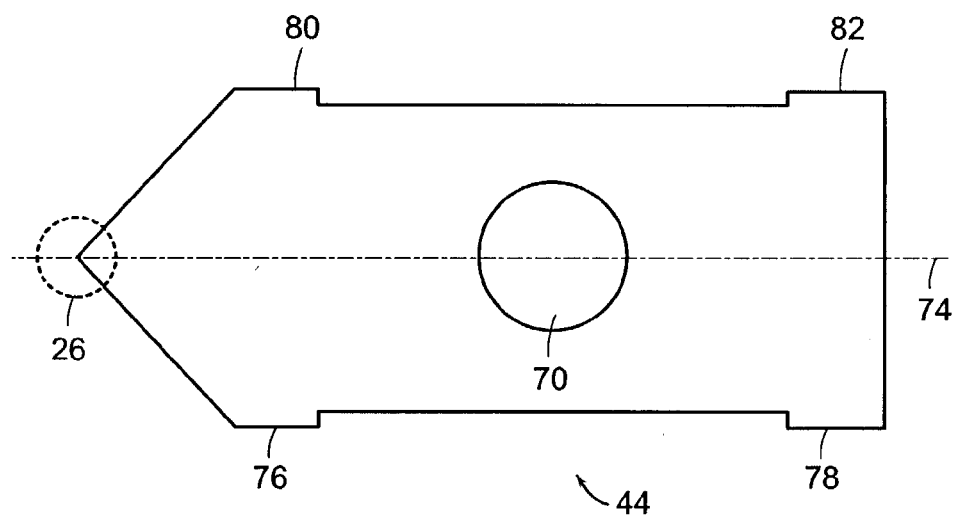
FIG. 2B is a top view of the cutting tool of FIG. 2A in accordance with a preferred embodiment of the present invention.
Figure 2C:
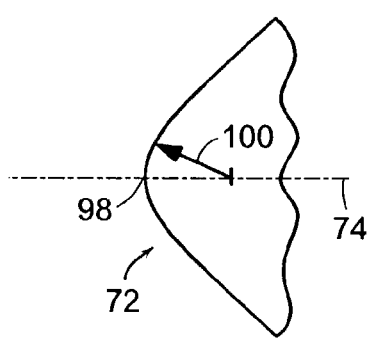
FIG. 2C illustrates an enlargement of the cutting tool cutting edge in accordance with a preferred embodiment of the present invention.

FIG. 2B is a top view of the cutting tool 44 of FIG. 2A in accordance with a preferred embodiment of the present invention. An enlargement of the cutting edge 72 is shown in FIG. 2C. A center point 98 on the cutting edge 72 lies in the plane of symmetry 74 of the cutting tool 44 as best seen in FIG. 2C. The cutting tool edge 72 has a radius of curvature 100 that lies in a plane that is substantially perpendicular to the plane of symmetry 74 of the cutting tool 44 and nominally in the plane of the top surface 84 of the cutting tool. In alternative embodiments the plane containing the radius of curvature can form a substantial angle with the top surface 84 of the cutting tool.

Figure 3:
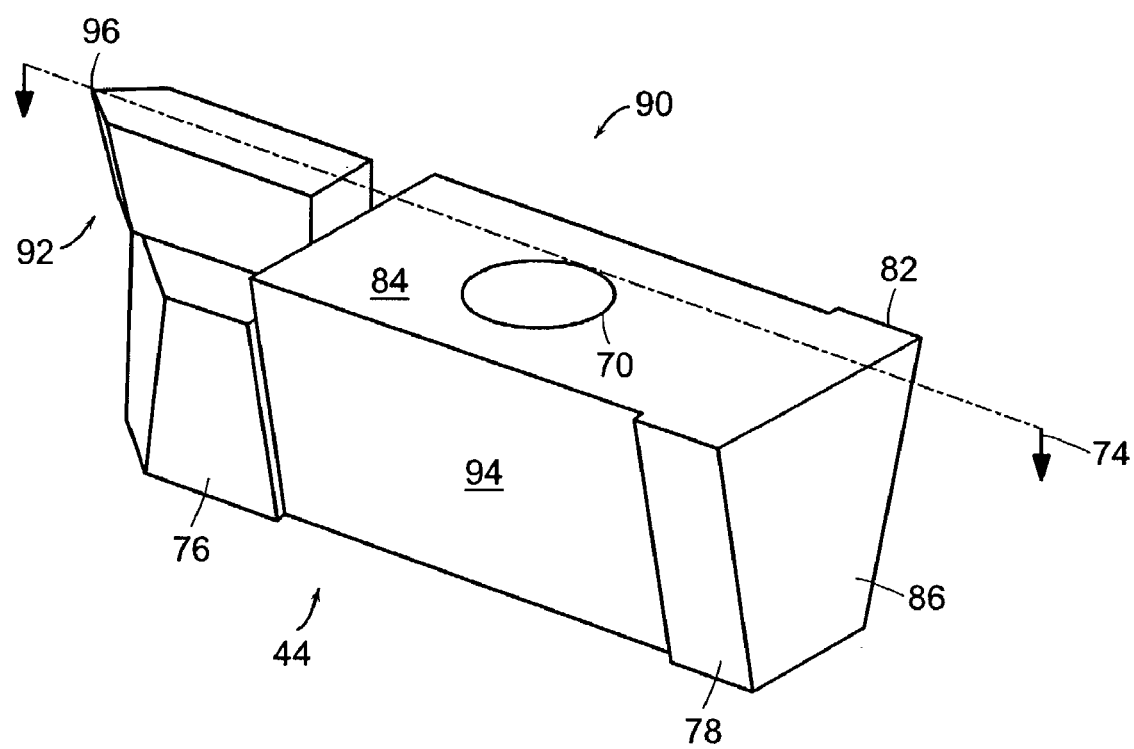
FIG. 3 is an isometric projection of an alternative embodiment of the cutting tool of FIG. 2A.
Figure 4:
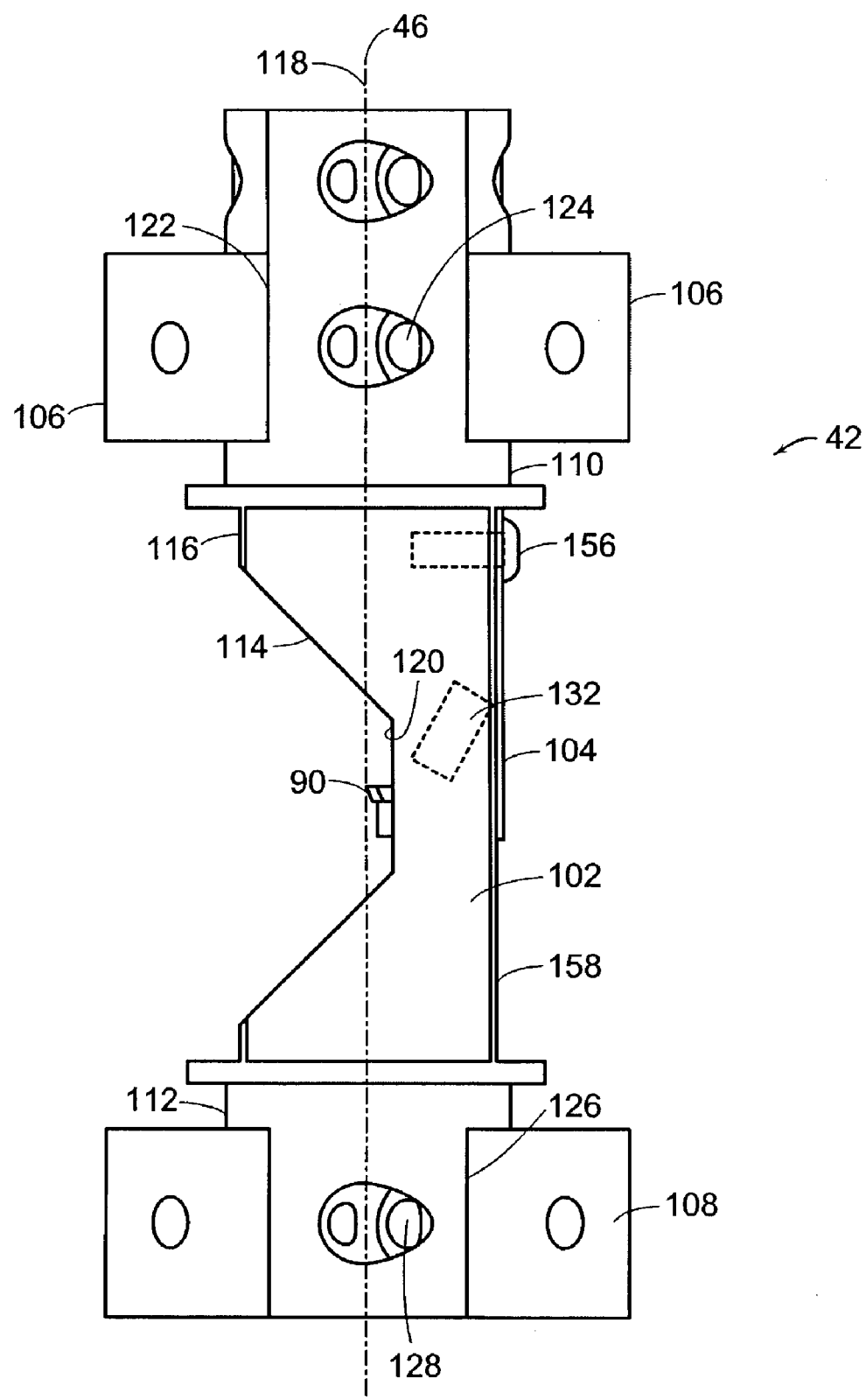
FIG. 4 is a side view sketch of a swing arm assembly of FIG. 1.

FIG. 3 shows an alternative embodiment of the cutting tool of FIG. 2A. The cutting tool 90, instead of being a single piece, has a cutting portion 92 set into a holder 94. The cutting portion 92 has a cutting edge 96. The holder 94 has left and right first and second mating surfaces 76, 78, 80 and 82 to mate with the swing arm assembly 42 as seen in FIG. 4. The holder 94 also has the threaded hole 70 substantially parallel to and nominally centered on the plane of symmetry 74.

In an alternate embodiment of the cutting tool, the cutting portion 92 is bonded directly to the swing arm 102 shown in FIG. 4, without the use of a holder 94. Bonding methods include, but are not limited to, epoxying, braising, soldering and diffusion bonding.

FIG. 4 is a left side view of the swing arm assembly 42 illustrated in FIG. 1. The swing arm assembly 42 has a swing arm 102, a tool clamp flexure 104, an upper pair of flexure blades 106, and a lower pair of flexure blades 108. The flexure blades are referred to herein as flexures and are pliant, extending members. The upper pair of flexures 106 and the lower pair of flexures 108 constrain the swing arm 102 in all degrees of freedom except rotation around an axis of rotation 46 that is nominally coincident with the long axis of the swing arm 102. In other preferred embodiments, the axis of rotation may be offset from but substantially parallel to the long axis of the swing arm. The swing arm 102 has an upper hub 110 and a lower hub 112. The swing arm 102 has a workpiece clearance cut 114 that is nominally midway between the upper hub 110 and the lower hub 112. The clearance cut 114 extends from a front face 116 of the swing arm 102 through the axis of rotation 46 and slightly beyond. A front/back plane 118 extends through the axis of rotation and parallel to the front face 116. The swing arm 102 has a back clearance surface 120 that is parallel to and spaced from the front/back plane 118. The clearance cut 114 allows the cutting tool edge 72 or 96 and a small portion of the cutting tool 44 or 90 to protrude from the back clearance surface 120 of the swing arm 102, and allows a workpiece to extend into the swing arm 102 as much as practicable.

In an alternate embodiment, one set of three flexures are attached to the swing arm and extend radially from the swing arm. The three flexures support the rotatable swing arm in the base and establish an axis of rotation for the swing arm. Those skilled in the art can appreciate that an embodiment of the present invention using two sets of flexures spaced apart on the swing arm so that the cutting tool is between the two sets, provides the swing arm with structural support at two opposite ends. In contrast, a single set of flexures at only one end of the swing arm provides a structural support that is less rigid. Decreasing the number of flexures from four to three also reduces the stiffness of the tool relative to the base. Preferred embodiments include a trade-off analysis to determine the number of flexures used. The trade-off in choosing three, four or more flexures and one or two sets of flexures involves considering the reduction of stiffness versus the reduction in moving mass and increase in the work space volume around the tool. To maintain a constant stiffness level at the tool, reducing the number of flexures requires increasing their dimension or choosing a material with a higher stiffness. Reducing the number of sets from two sets to one set of flexures (for example, by removing the lower flexures 108) requires the same trade-off analysis, increasing the bending stiffness of the swing arm and possibly decreasing the length of the flexures. The material of the flexures can include, without limitation, steel, beryllium-based alloys and materials that have a high fatigue strength to stiffness ratio. The material of the swing arm can include, without limitation, aluminum, steel, beryllium and composite materials that have a high stiffness to weight ratio.

The central portion of the upper flexure blade pair 106 is fixed to the swing arm 102 by bonding the flexure blades in a pair of upper slots 122 in the upper hub 110, and can be further secured by tightening a plurality of upper slot screws 124. The central portion of the lower flexure blade pair 108 is fixed to the swing arm 102 by bonding the flexure blades in a pair of lower slots 126 in the lower hub 112, and can be further secured by tightening a plurality of lower slot screws 128. A tool clamp screw 132 carried by the swing arm 102 works with the tool clamp flexure 104 to fix the cutting tool 44 or 90 in the swing arm 102.

FIG. 5 is a front view of the swing arm assembly 42 of FIG. 4 holding the cutting tool 90 of FIG. 3. The swing arm 102 has a right/left plane of symmetry 136 that contains the swing arm axis of rotation 46 and is perpendicular to the front/back plane 118, shown in FIG. 4. The swing arm 102 has a slot 138 that receives the cutting tool 90. The slot 138 has a plane of symmetry 140 that divides the slot 138 into right and left halves. The slot 138 is located in the swing arm 102 approximately midway between the upper hub 110 and the lower hub 112. The slot plane of symmetry 140 is parallel to the right/left plane of symmetry 136 and is offset from the swing arm axis of rotation 46 by a distance equal to an offset radius 142.

Figure 6:
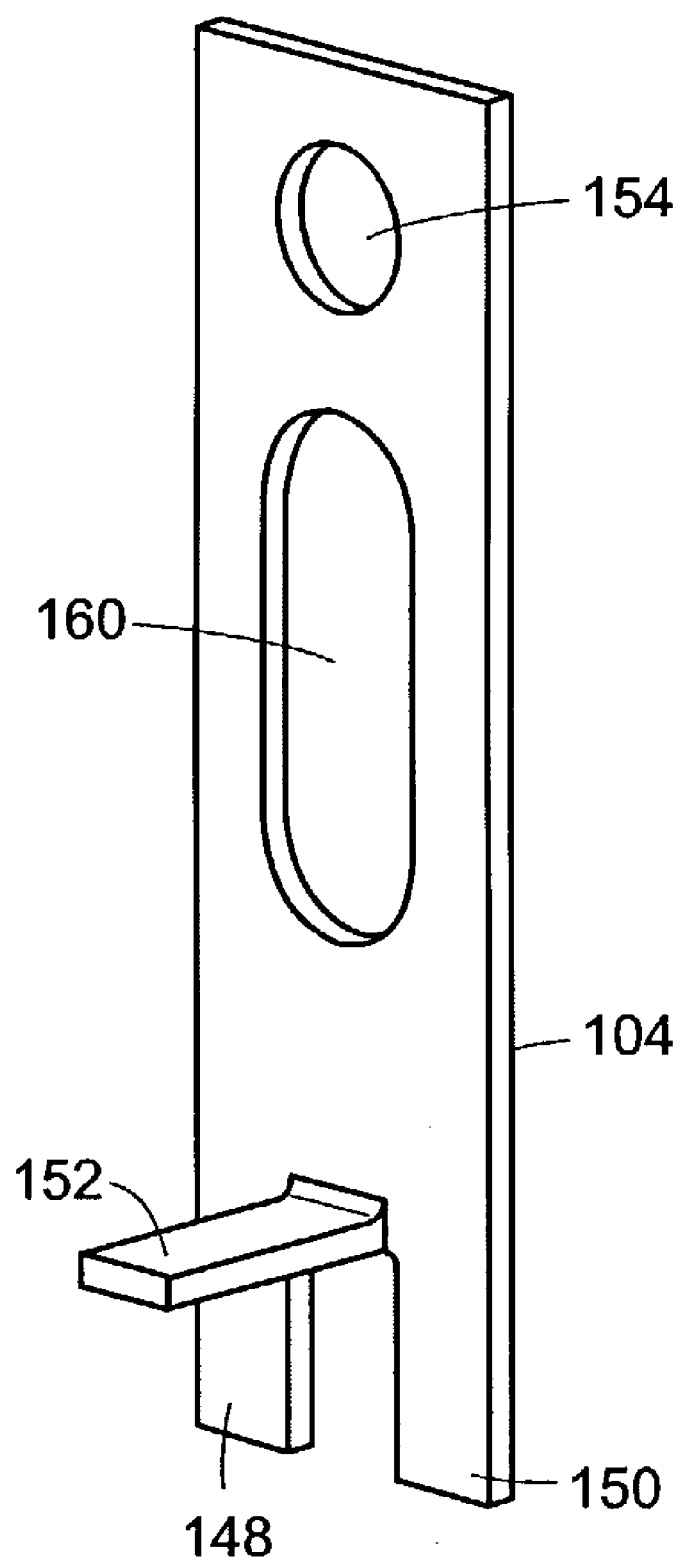
FIG. 6 is an isometric projection of a tool clamp flexure of the swing arm assembly of FIG. 4.

The cutting tool 90 is located in the swing arm 102 by mating four surfaces 76, 78, 80 and 82 on the cutting tool 90, which form a taper angle 88, to a pair of surfaces 144 and 146 in the swing arm slot 138, and mating the back surface 86 of the cutting tool 90 with a pair of back blades 148 and 150 as shown in FIG. 6 of the tool clamp flexure 104.

It can be appreciated by those skilled in the art that the holding force and alignment between a tool and a tool holder can be improved by providing the tool with a taper angle that mates with a receiving feature in a tool holder. The present embodiment improves upon this method by creating four mating areas on the tool for contact between the tool and the slot. Those skilled in the art will recognize that the discontinuity of the mating surface 76 and 78 and of the mating surface 80 and 82 by the recess in between the two portions provides four distinct areas of contact between the cutting tool 90 and the receiving surfaces 144 and 146 of the swing arm slot 138. This results in improved mating and alignment of the cutting tool 90 with the swing arm slot 138, compared to a design that utilizes simpler continuous surfaces on the cutting tool 90.

When the cutting tool 90 is held in the swing arm 102, the cutting tool plane of symmetry 74 and the swing arm slot 138 plane of symmetry 140 are coincident, and the cutting tool top surface 84 is nominally perpendicular to the swing arm axis of rotation 46. Furthermore, the center point 98 on the cutting tool edge 96 is offset from the swing arm right/left plane of symmetry 136 by a distance equal to the offset radius 142, and the center point 98 lies nominally in the swing arm front/back plane 118, as seen in FIG. 4. In alternate embodiments the center point 98 lies in front of or behind the swing arm front/back plane 118.

FIG. 6 shows the tool clamp flexure 104. The tool clamp flexure 104 has a front blade 152 that is interposed between the first back blade 148 and the second back blade 150 and is substantially perpendicular to the back blades 148 and 150. The tool clamp flexure 104 has a hole 154 for receiving a fastener 156 to secure the tool clamp flexure 104 to the swing arm back surface 158 as seen in FIG. 4. The tool clamp flexure 104 also has an access slot 160. The access slot 160 allows access to the tool clamp screw 132.

Figure 7:
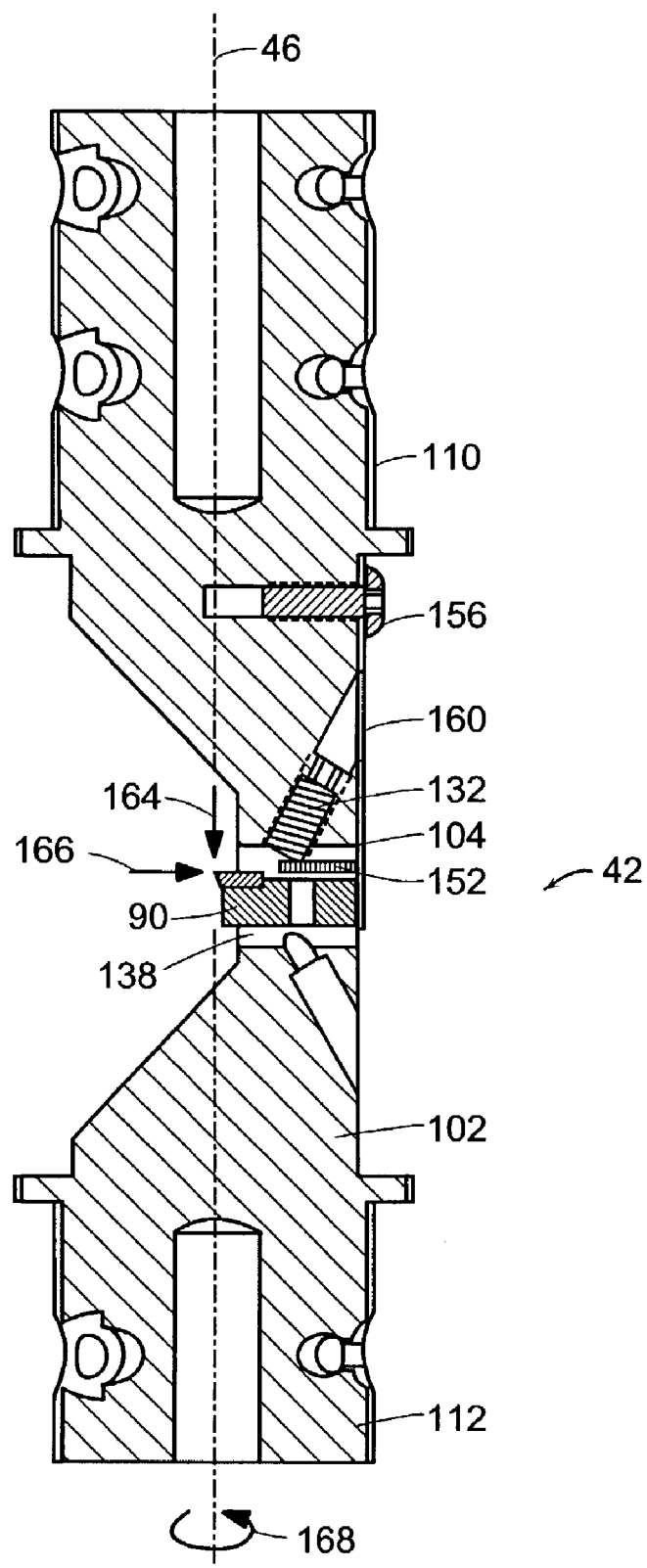
FIG. 7 is a side cross-sectional view of the swing arm assembly of FIG. 4.

FIG. 7 is a side cross-sectional view of the swing arm assembly 42. In operation, the tool clamp flexure 104 is located on the swing arm 102 such that the cutting tool 90 is located under the front blade 152 of the tool clamp flexure 104. The tool clamp screw 132 which is accessible through the flexure slot 160, pushes on the front blade 152 of the tool clamp flexure 104 causing the front blade 152 to deflect and contact the cutting tool top surface 84, forcing the cutting tool 90 downward in the swing arm slot 138. In an alternative embodiment a screw engages the threaded hole 70 in the cutting tool 90 to draw down the cutting tool 90 into the swing arm slot 138.

When the cutting tool edge 96 and workpiece 50 contact each other during use, a cutting force 164 and a thrust force 166 develops between the two bodies. The cutting force 164 is in a direction substantially parallel to the swing arm axis of rotation 46. The thrust force 166 is in a direction substantially perpendicular to the swing arm axis of rotation 46. Both the cutting force 164 and the thrust force 166 lie substantially in the plane of symmetry 140 of the slot 138 shown in FIG. 5. The cutting force 164 and thrust force 166 are opposed by the upper pair of flexure blades 106 and the lower pair of flexure blades 108, as seen in FIG. 5. Still referring to FIG. 7, the thrust force 166, in this example, also produces a torque 168 by acting at a distance equal to the off-set radius 142 from the swing arm axis of rotation 46.

The torque 168 is opposed by a torque produced by the actuator 68 as shown in FIG. 1.

Figure 8:
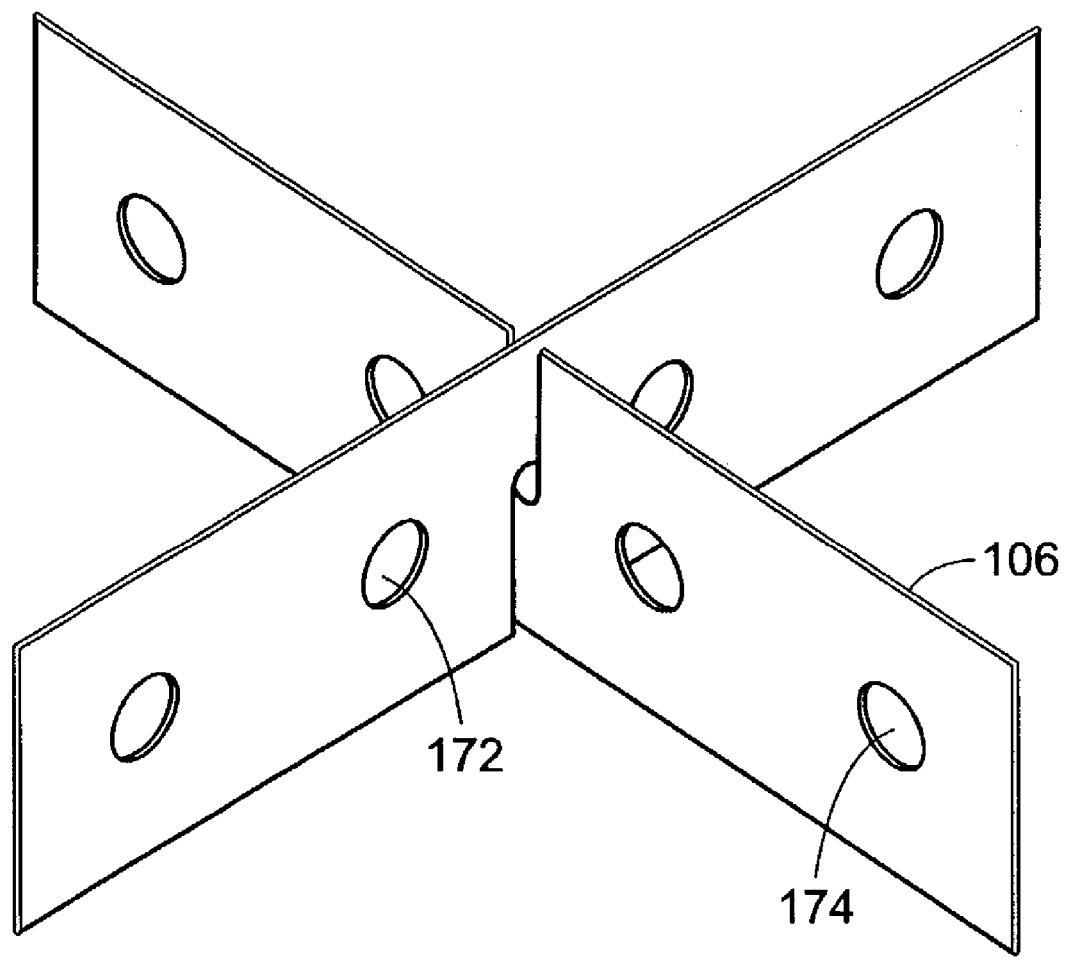
FIG. 8 is an isometric projection of a pair of flexures of the swing arm assembly of FIG. 4.

FIG. 8 shows the pair of upper flexure blades 106. The lower flexure blades 108 are similarly constructed in this embodiment. Each pair of flexure blades 106 and 108 has a first flexure blade and a second flexure blade positioned substantially perpendicular to each other. Each of the blades 106 has a plurality of holes 172 and 174. The outer holes 174 are used for securing the flexure blades 106 to the swing arm base 48. The inner holes 172 allow for the upper slot screws 124 to pass from one portion of the upper hub 110 to another portion of the hub for securing the flexure blades 106 in the slots 122. The hole in the flexure blade through which the screw passes provides adequate clearance so there is no interference with the tension.

Figure 9:
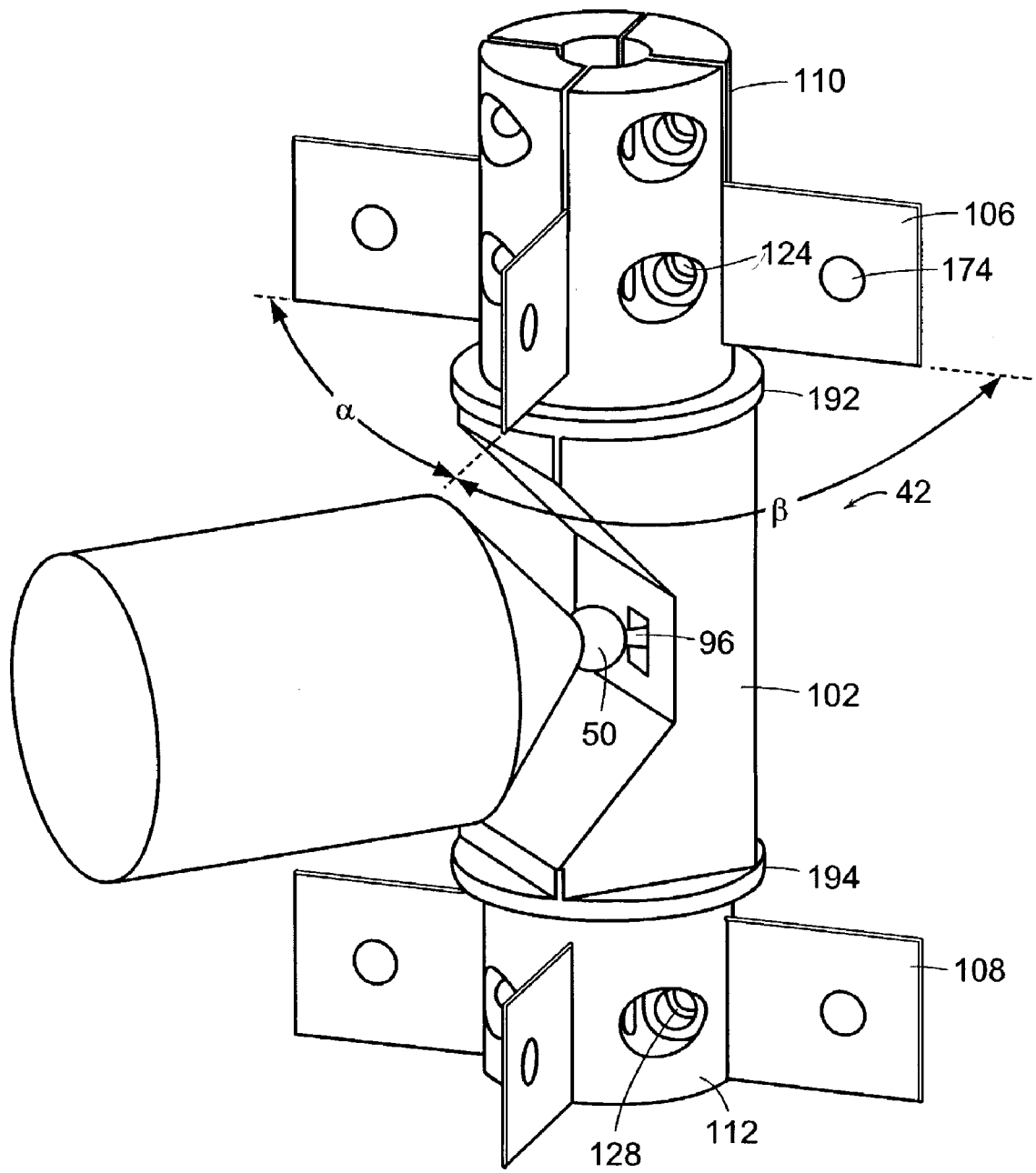
FIG. 9 is an isometric projection of the swing arm assembly of FIG. 4 illustrating two pairs of flexures of FIG. 8 and a workpiece in accordance with a preferred embodiment of the present invention.

FIG. 9 shows the swing arm assembly 42 and the workpiece 50. The swing arm assembly 42 has the upper pair of flexures or flexure blades 106 in the upper hub 110 and the lower pair of flexures or flexure blades 108 in the lower hub 112. In the swing arm assembly 42, the upper and lower pairs of flexure blades or elements 106 and 108 are oriented at an angle of forty-five degrees from the swing arm right/left plane of symmetry 136, as shown in FIG. 5, so as to maximize the open space between the workpiece 50 and the swing arm base 48, as best seen in FIG. 1.

The central portion of the pair of the upper flexure blades 106 is fixed to the swing arm 102 by bonding the flexure blades 106 in the upper slots 122 in the upper hub 110, and can be further secured by tightening the upper slot screws 124. The upper slot screws 124 pass through holes 172 of the upper flexure blades 106. The central portion of the pair of the lower flexure blades 108 is fixed to the swing arm 102 by bonding the flexure blades in the lower slots 126 in the lower hub 112, and can be further secured by tightening the lower slot screws 128. Those skilled in the art will recognize that by properly tightening the screws 124 and 128, the bonded joint can be preloaded in compression to the extent necessary to avoid stress reversal in the bonded joint during use of the embodiments of the present invention. It is well known that stress reversal and tension/compression cycles, reduce the fatigue life of a mechanical component.

Rotation of the swing arm 102 relative to the base 48 causes an out-of-plane bending in the upper and lower pairs of flexure blades 106 and 108. The in-plane stiffness of each flexure blade, when combined as a system of upper and lower pairs of flexure blades 106 and 108, constrains the swing arm 102 in five of six possible degrees of freedom, leaving free rotation around the swing arm axis of rotation 46 shown in FIG. 5. That is, the upper pair of flexure blades 106 and lower pair of flexure blades 108 support and constrain the swing arm 102 as a fixed-end/fixed-end beam with a single degree of freedom of rotation around the swing arm axis of rotation 46. Those skilled in the art will recognize that the swing arm 102 is actually over-constrained by the upper and lower pairs of flexure blades 106 and 108 in the sense that the blades will resist large rotations that would require them to stretch substantially. This is acceptable in the embodiments of the present invention since the swing arm 102 is subjected to relatively small rotation angles around the swing arm axis of rotation 46. Since the cutting edge 96 is located inside of the virtual cylinder formed by joining the upper hub 110 and lower hub 112, and is spaced a small distance (i.e. the offset radius 142) from the swing arm axis of rotation 46, the bending moment on the swing arm 102 from the cutting force 164 as represented by 170 in FIG. 5, is kept within a tolerable range. In an alternate preferred embodiment, the cutting edge 96 is located outside of the virtual cylinder formed by joining the upper hub 110 and lower hub 112, and is spaced a larger distance (i.e. the offset radius 142) from the swing arm axis of rotation 46.

One skilled in the art will recognize that the swing arm 102 and flexure blades 106 and 108 can be manufactured as a single unit by machining a single piece of material using a variety of methods including wire electro-discharge machining, and will also recognize that the swing arm 102, flexure blades 106 and 108, and a portion or all of the base 48 can be manufactured as a single unit by machining a single piece of material with the above described methods.

As described hereinbefore, preferred embodiments can include as a minimum, one set of three flexures that are disposed on the swing arm and extend radially from the swing arm. The blades are disposed around the swing arm in an angular relationship as illustrated in FIG. 9 of angle $\alpha$ or $\beta$ between the blades. The angles $\alpha$ and $\beta$ can be optimized such that the flexures keep the center line of the rotating piece fixed. In an embodiment, the three flexures form a T-shape wherein angles $\alpha=\beta=90°$. In another preferred embodiment, the angles $\alpha$ and $\beta$ are non-equidistant but are optimized to increase the work space around the tool while providing the desired amount of support and stiffness at the tool to resist the cutting forces developed between the tool and the workpiece.

Figure 10:
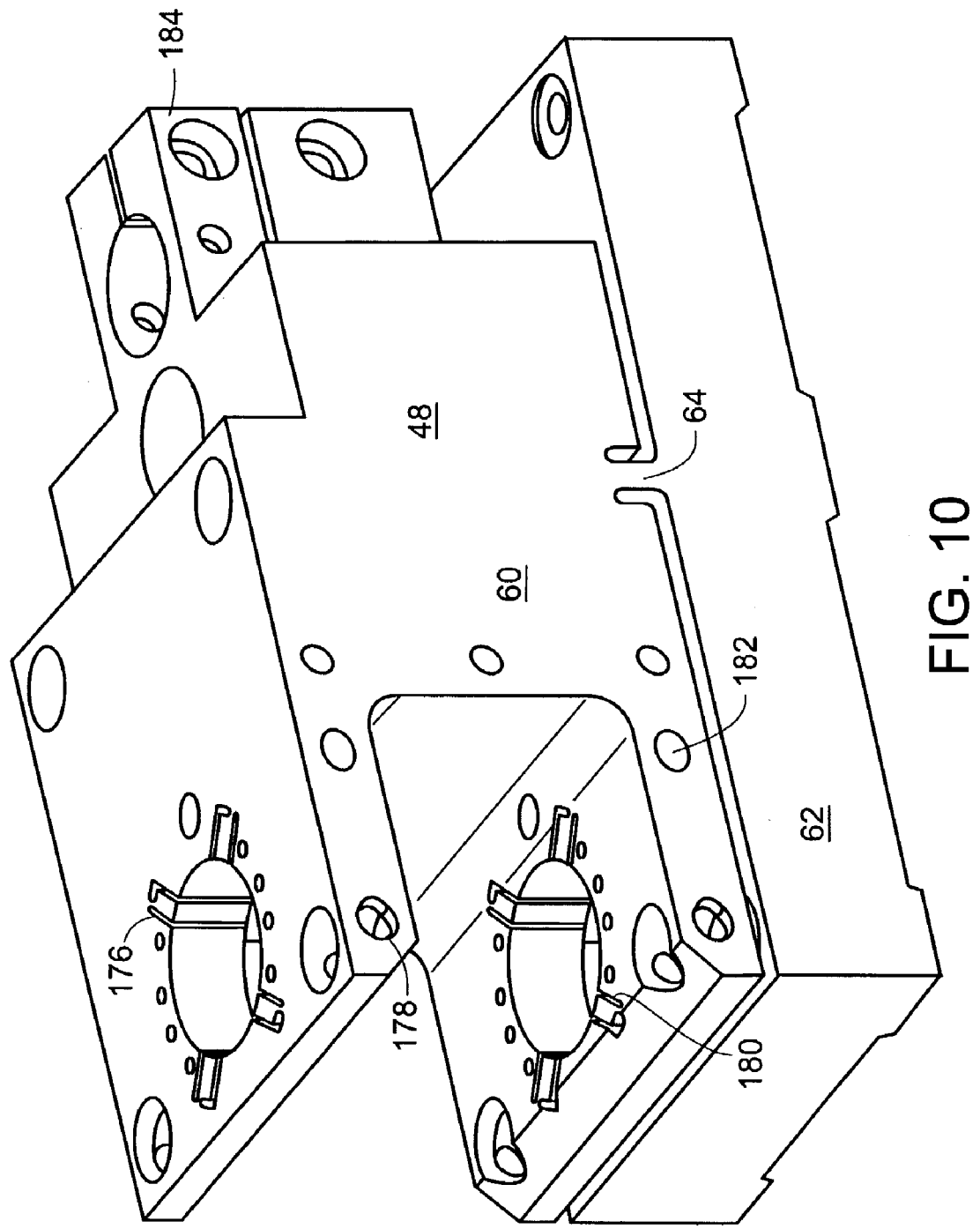
FIG. 10 is an isometric projection of the swing arm base of FIG. 1.

The swing arm base 48 is shown in FIG. 10 in accordance with a preferred embodiment of the present invention. The outer ends of the pair of the upper flexure blades 106 are fixed to the swing arm base 48 by bonding the flexure blades 106 in a plurality of base upper slots 176, and can be further secured by tightening a plurality of base upper slot screws 178. The outer ends of the pair of the lower flexure blades 108 are fixed to the swing arm base 48 by bonding the flexure blades in a plurality of base lower slots 180, and can be further secured by tightening the base lower slot screws 182. Those skilled in the art will recognize that by properly tightening the screws 178 and 182 the bonded joint can be preloaded in compression to the extent necessary to avoid stress reversal in the bonded joint during use of the invention. It is well known that stress reversal, tension/compression cycles, reduces the fatigue life of a mechanical component.

The upper and lower pairs of flexure blades 106 and 108 as seen in FIG. 9, are preloaded into tension during assembly of the flexure blade pairs with the swing arm 102 and the swing arm base 48. Those skilled in the art will recognize that the performance of the flexure blades is improved by having a certain amount of preload tension in the blades during use. The swing arm 102 and the swing arm base 48 are made of materials that have a similar coefficient of thermal expansion (CTE-1). The upper and lower pairs of flexure blades 106 and 108 are made of a material that has a higher coefficient of thermal expansion (CTE-2). In an embodiment, the swing arm 102 and swing arm base 48 are made of steel, and beryllium-copper is used for the pairs of flexure blades 106 and 108, resulting in a difference in coefficient of thermal expansion of approximately 3 parts per million per degree Fahrenheit. Initial assembly of the upper and lower pairs of flexure blades 106 and 108 with the swing arm 102 and the swing arm base 48 is performed at the ambient temperature that the fast tool servo will be used at, and is nominally room temperature. The upper and lower pairs of flexure blades 106 and 108 are bonded to the swing arm 102 and swing arm base 48 at a temperature above the ambient use temperature. The choice of temperature during the bonding process depends on the materials chosen for the swing arm 102, base 48, and the pairs of flexure blades 106 and 108, and the desired level of tension preload in the flexure blades. These parameters can be chosen to allow a bonding temperature in the range of the ambient temperature that the fast tool servo will be used to many hundreds of degrees Fahrenheit, thus accommodating bonding methods ranging from elevated temperature-cure adhesives to soldering and brazing. Because CTE-2 is greater than CTE-1, a tensile force is developed in the upper and lower pairs of flexure blades 106 and 108 when the temperature of the bonded assembly is returned to the ambient use temperature.

Still referring to FIG. 10, the flexure hinge 64 is shown between the upper portion 60 of the base 48 and the lower portion 62 of the base 48. As indicated with respect to FIG. 1, the differential screw assembly 66 has a tip 214, as shown in FIG. 1, that is carried by a block assembly 184 in the upper portion 60 and engages the lower portion 62 of the base 48. The rotation of the screw 66 is used in a method of adjusting the position of the cutting edge relative to the workpiece. Further, both the plurality of base upper slots 176 and the plurality of base lower slots 180 are located on the upper portion 60 of the base 48.

Figure 11:
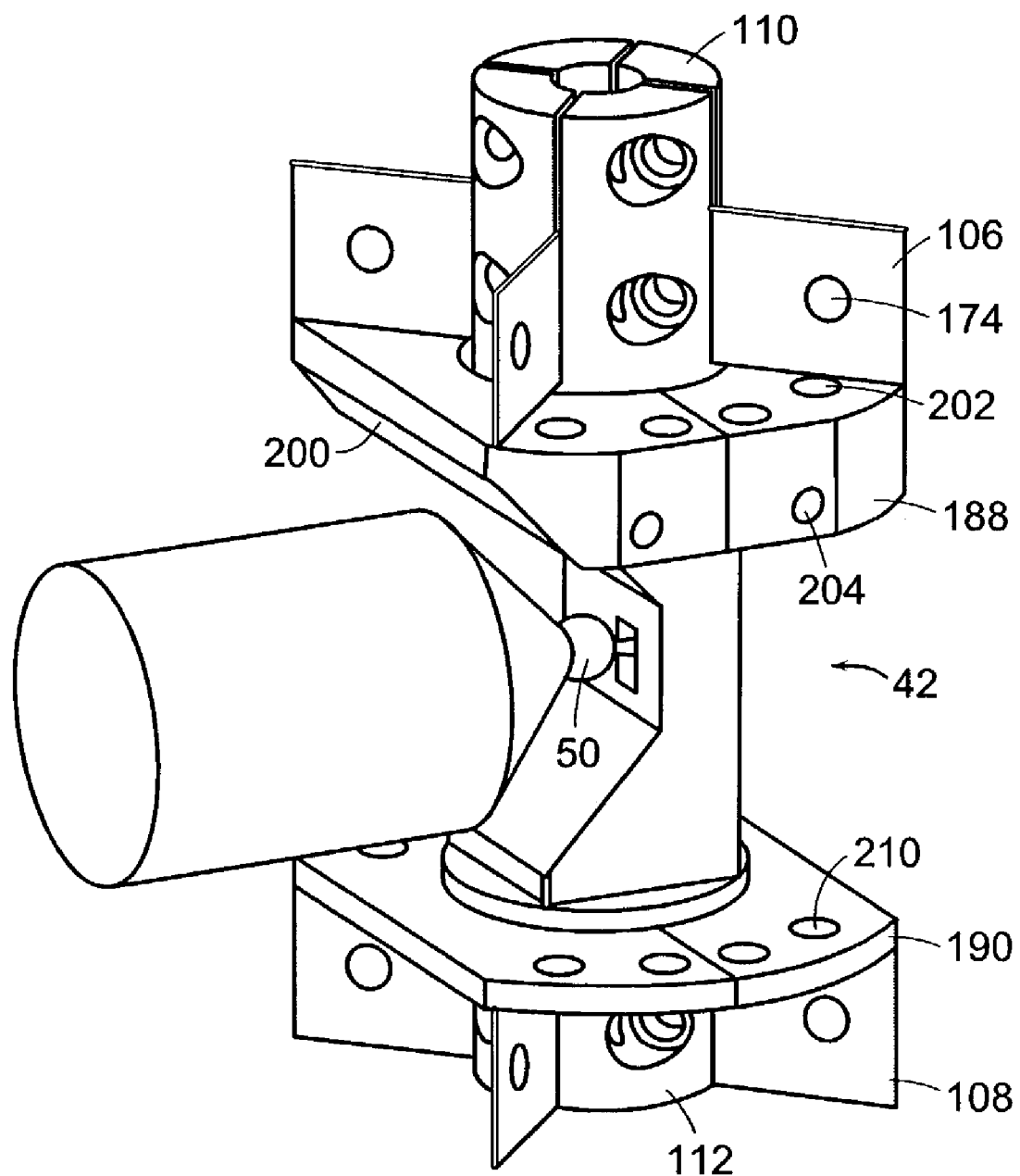
FIG. 11 is an isometric projection of the swing arm assembly of FIG. 4 with two pairs of flexures of FIG. 8, a workpiece, and chip shields in accordance with a preferred embodiment of the present invention.
Figure 12:
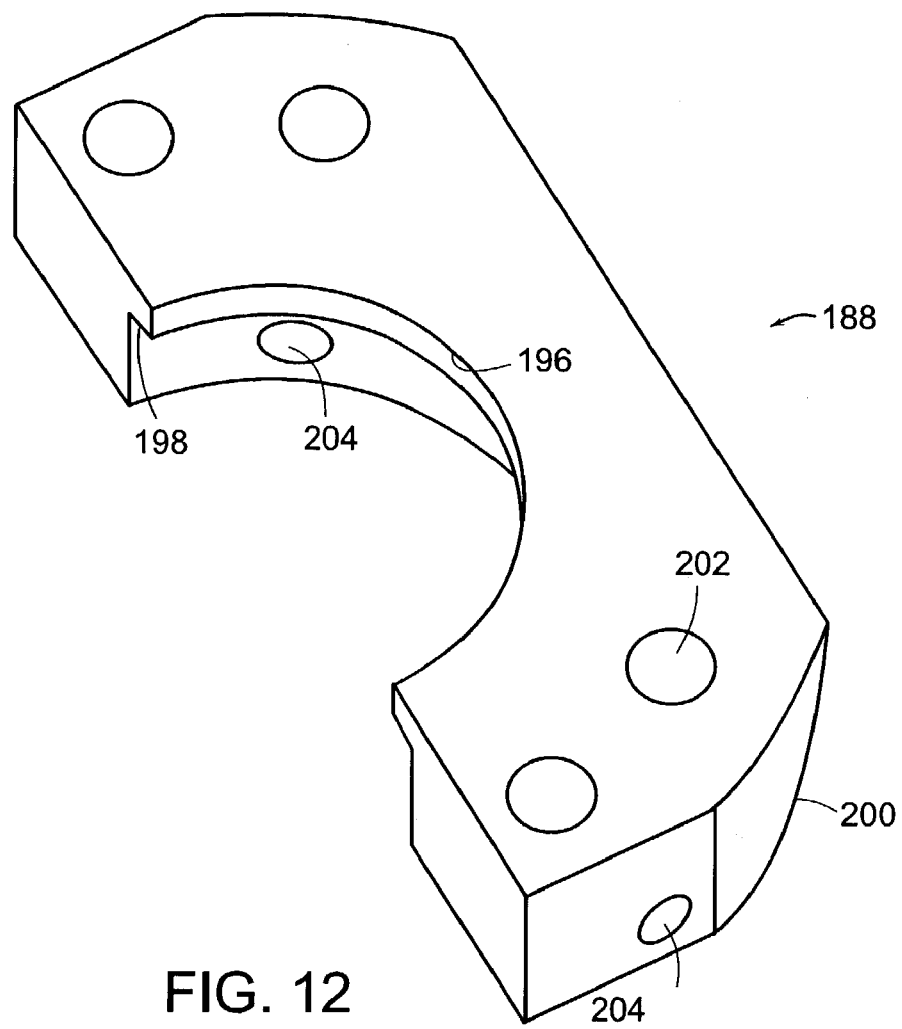
FIG. 12 is a perspective view of the upper chip shield of FIG. 11.
Figure 13:
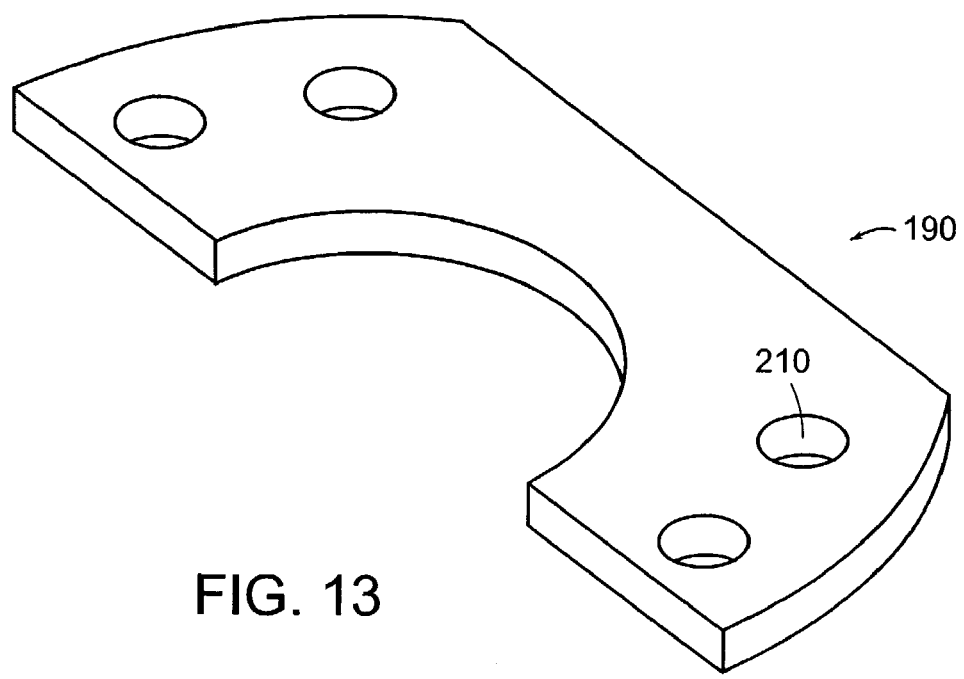
FIG. 13 is a perspective view of the lower chip shield of FIG. 11.

FIG. 11 shows the swing arm assembly 42 with the workpiece 50. The swing arm assembly 42 has an upper chip shield 188 and a lower chip shield 190 that protects the flexure blades 106 and 108 set in the upper hub 110 and lower hub 112 of the swing arm assembly 42 when the swing arm assembly 42 is secured to the base 48 as shown in FIG. 1. The upper chip shield 188 also shown in FIG. 12, is mounted below the upper flexure blades 106. The lower chip shield 190 also shown in FIG. 13, is mounted above the lower flexure blades 108.

The swing arm 102 has an upper skirt 192, as best shown in FIG. 9, and a lower skirt 194 to prevent debris generated during use from entering and accumulating between the swing arm 102 and the base 48 in the areas near the upper and lower pairs of flexure blades 106 and 108. The upper chip shield 188 mounts to the swing arm base 48 and engages the upper skirt 192 to form a simple labyrinth seal above the upper skirt 192. The lower chip shield 190 mounts to the swing arm base 48 and engages the lower skirt 194 to form a simple labyrinth seal below the lower skirt 194.

The upper chip shield 188 is formed of two pieces. One of the pieces is shown in FIG. 12 and has a lip 196 that forms an annular groove 198 that receives the upper skirt 192 of the swing arm 102. In addition, the upper chip shield 188 has a tapered edge 200 on the front portion to increase the clearance for the workpiece 50 and the workpiece holder 51. The upper chip shield 188 has a plurality of vertical holes 202 for receiving fasteners to secure the upper chip shield 188 to the base 48. In addition, the upper chip shield 188 has a plurality of horizontal holes 204 through which the hard stops 212 as seen in FIG. 14 extend.

The lower chip shield 190 is formed of two identical pieces. One of the pieces is shown in FIG. 13. The lower chip shield 190 has a plurality of holes 210 for receiving fasteners to secure the lower chip shield 190 to the base 48.

Figure 14:
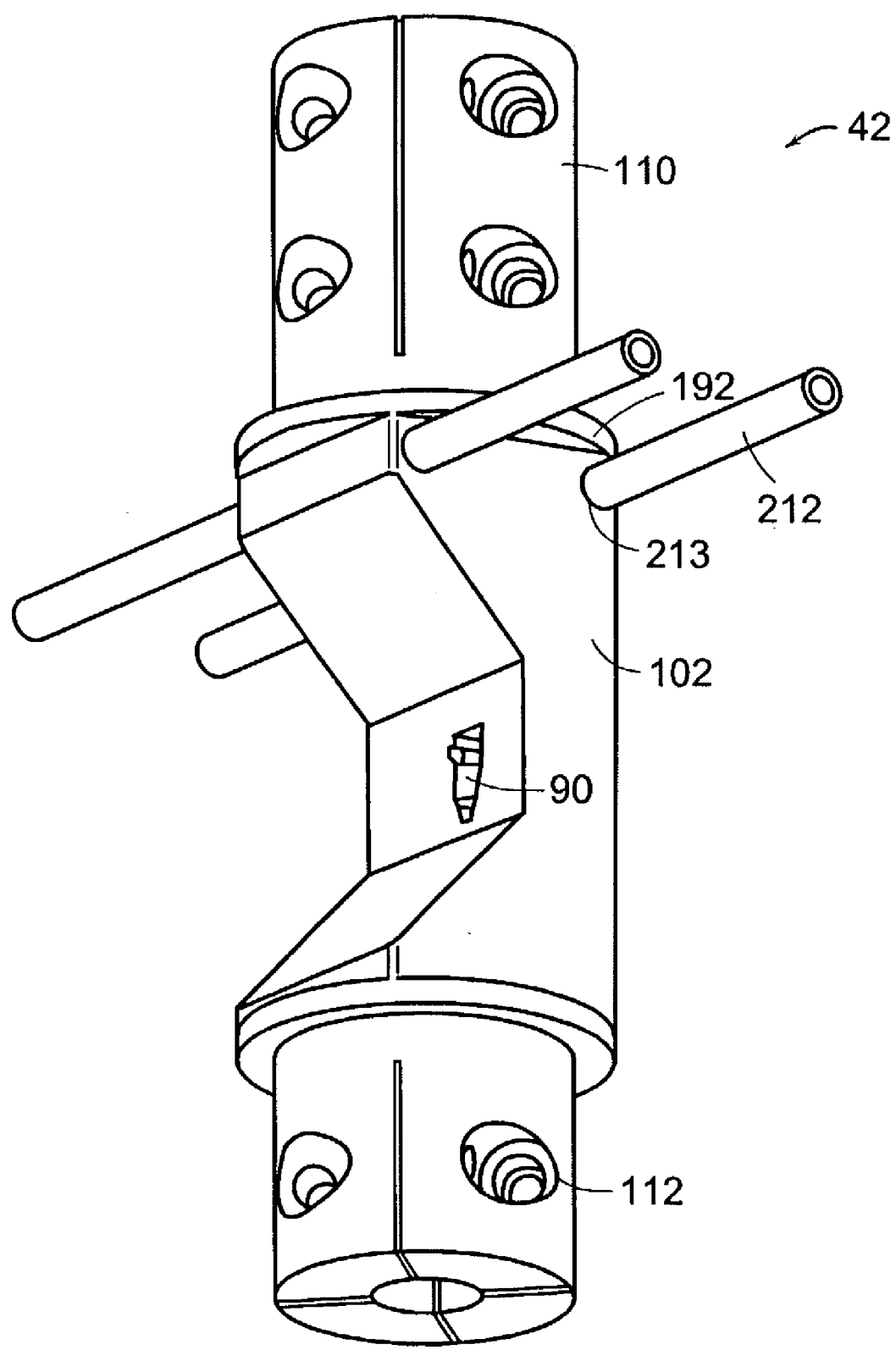
FIG. 14 is a perspective view of the swing arm assembly of FIG. 4 with hard stops.

FIG. 14 shows the swing arm assembly 42 with four hard stops 212. The hard stops 212 are located near the swing arm 102 below the upper skirt 192 and extend outward from the swing arm 102 substantially perpendicular to the swing arm right/left plane of symmetry 136. The upper chip shield 188, as seen in FIG. 12, has a thickened cross-section to accept the hard-stops 212. A small gap 213 between an end of each hard stop 212 and the swing arm 102 allows normal rotation of the swing arm. The hard stops 212 act in pairs to limit the rotation angle of the swing arm 102 to prevent damage to the upper and lower pairs of flexure blades 106 and 108. Excessive rotation of the swing arm 102 causes closure of a pair of gaps 213 that limits rotation of the swing arm.

Figure 15:
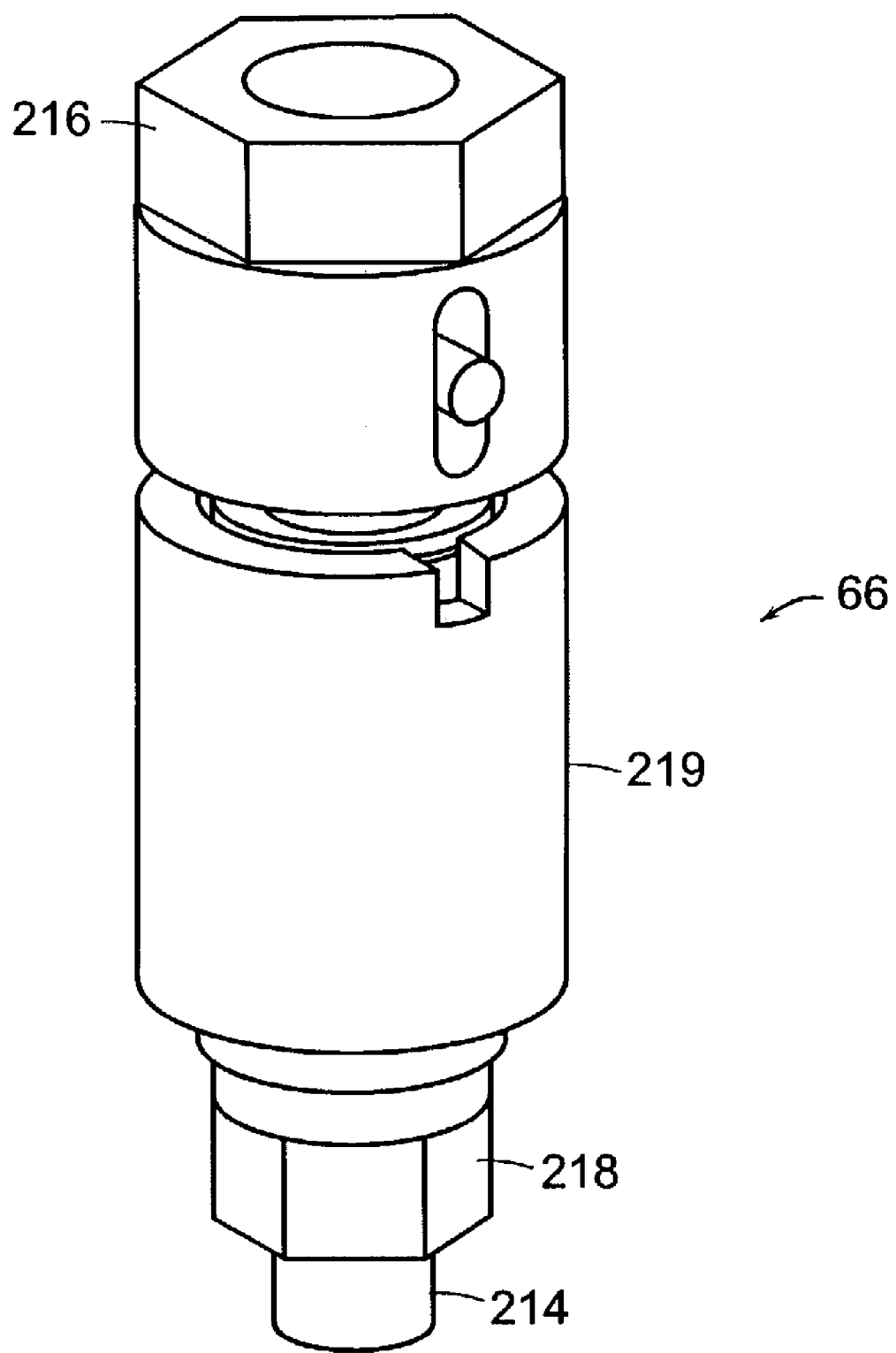
FIG. 15 is a perspective view of a differential screw assembly in accordance with a preferred embodiment of the present invention.

FIG. 15 is a perspective view of the differential screw assembly 66. The differential screw assembly 66 has a tip 214, a coarse adjustment screw 216, a fine adjustment screw 218, and a housing 219. The interface between the tip 214 and the fine adjustment screw 218 consists of a set of machined threads having a thread pitch P-1. The interface between the fine adjustment screw 218 and the housing 219 consists of a set of machined threads having a thread pitch P-2. In operation, the differential screw assembly 66 is mounted in the upper portion 60 of the swing arm base 48 with the tip 214 in contact with the lower portion 62 of the swing arm base 48.

Figure 16A:
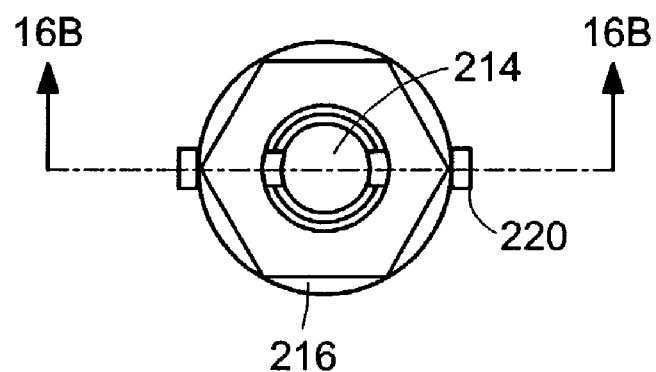
FIG. 16A is a top view of the differential screw assembly of FIG. 15.
Figure 16B:
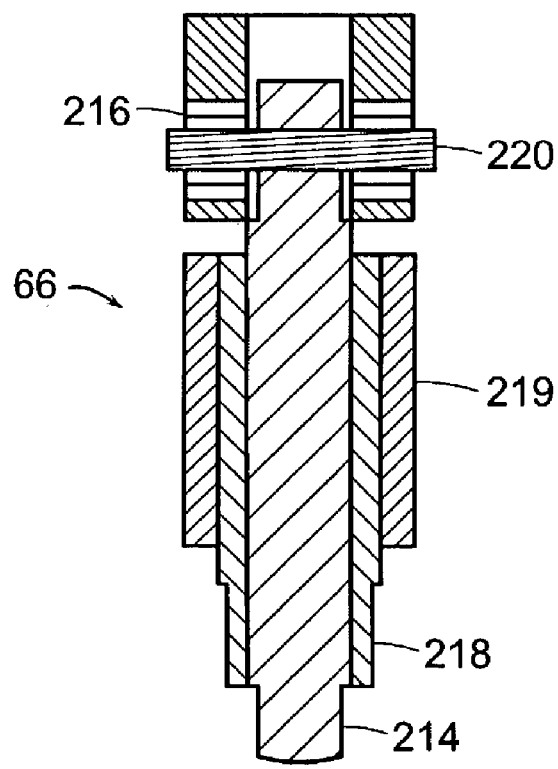
FIG. 16B is a cross-sectional view of the differential screw assembly taken along the line 16B-16B of FIG. 16A.

FIG. 16A is a top view of the differential screw assembly 66. FIG. 16B is a side cross-sectional view of the differential screw assembly 66 taken along the line 16B-16B of FIG. 16A. The extension of the tip 214 of the differential screw 66 is adjusted using the coarse adjustment screw 216 and the fine adjustment screw 218. Turning the coarse adjustment screw 216 transmits rotation through pin 220 to the tip 214 while the fine adjustment screw 218 is stationary. Locking the coarse adjustment screw 216 and rotating the fine adjustment screw 218 causes motion in one direction between the coarse adjustment screw 216 and fine adjustment screw 218, and motion in the opposite direction between the fine adjustment screw 218 and the housing 219, while the pin 220 prevents rotation of the tip 214. The motion of the tip 214 relative to the housing 219 is related to the difference in the thread pitches P-1 and P-2.

Figure 17:
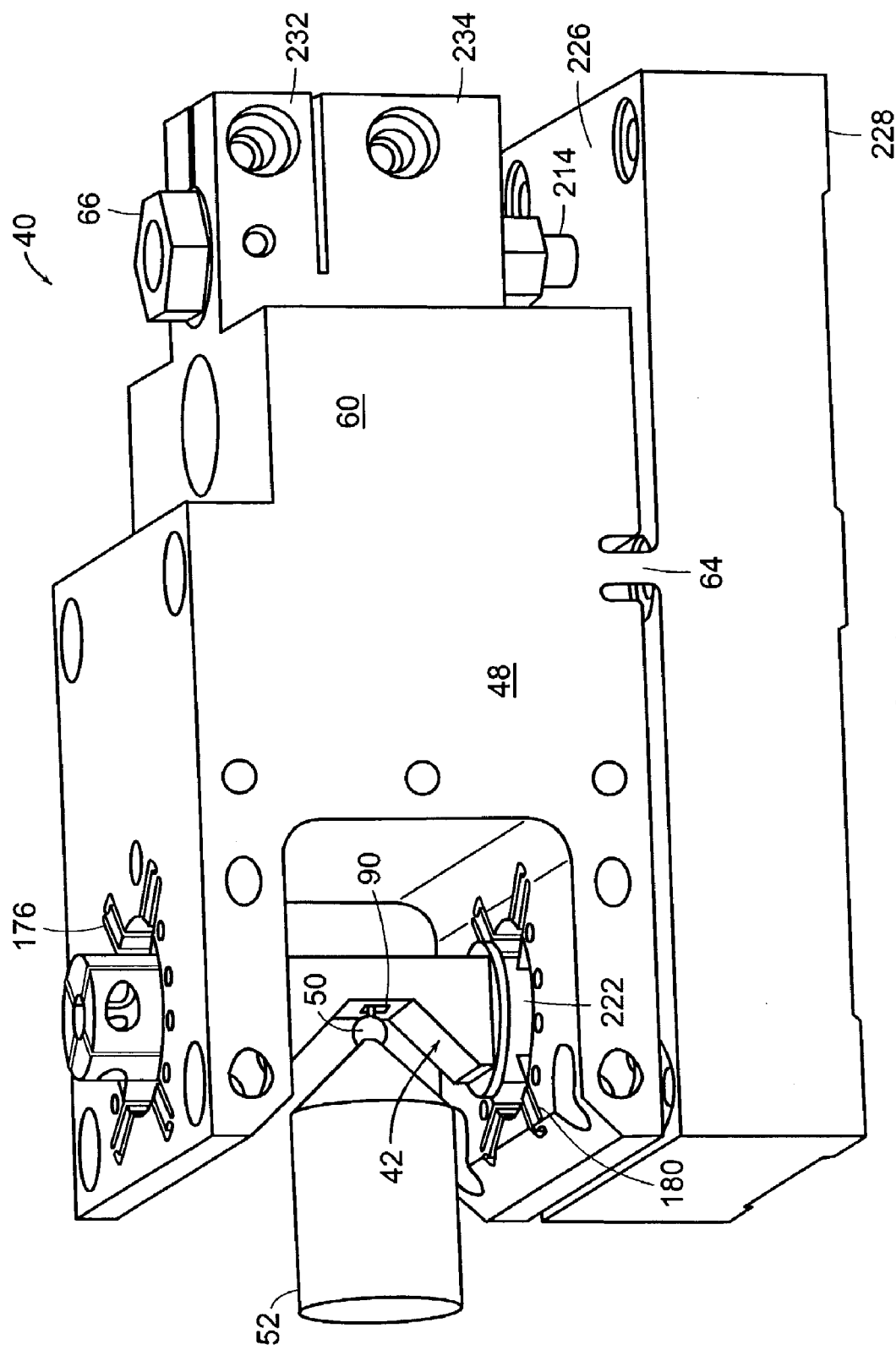
FIG. 17 is a perspective view of the rotary fast tool servo assembly of FIG. 1 without the actuator.

FIG. 17 shows the rotary fast tool servo assembly 40 without the actuator 68. The workpiece 50 is also shown. The swing arm assembly 42 is mounted in the upper portion 60 of the base 48. The base 48 has a pair of essentially concentric circular openings 222 to receive the swing arm assembly 42. Each of the two openings 222 has the plurality of slots 176 and 180 to receive the flexure blades extending radially from the swing arm 42.

Figure 18:
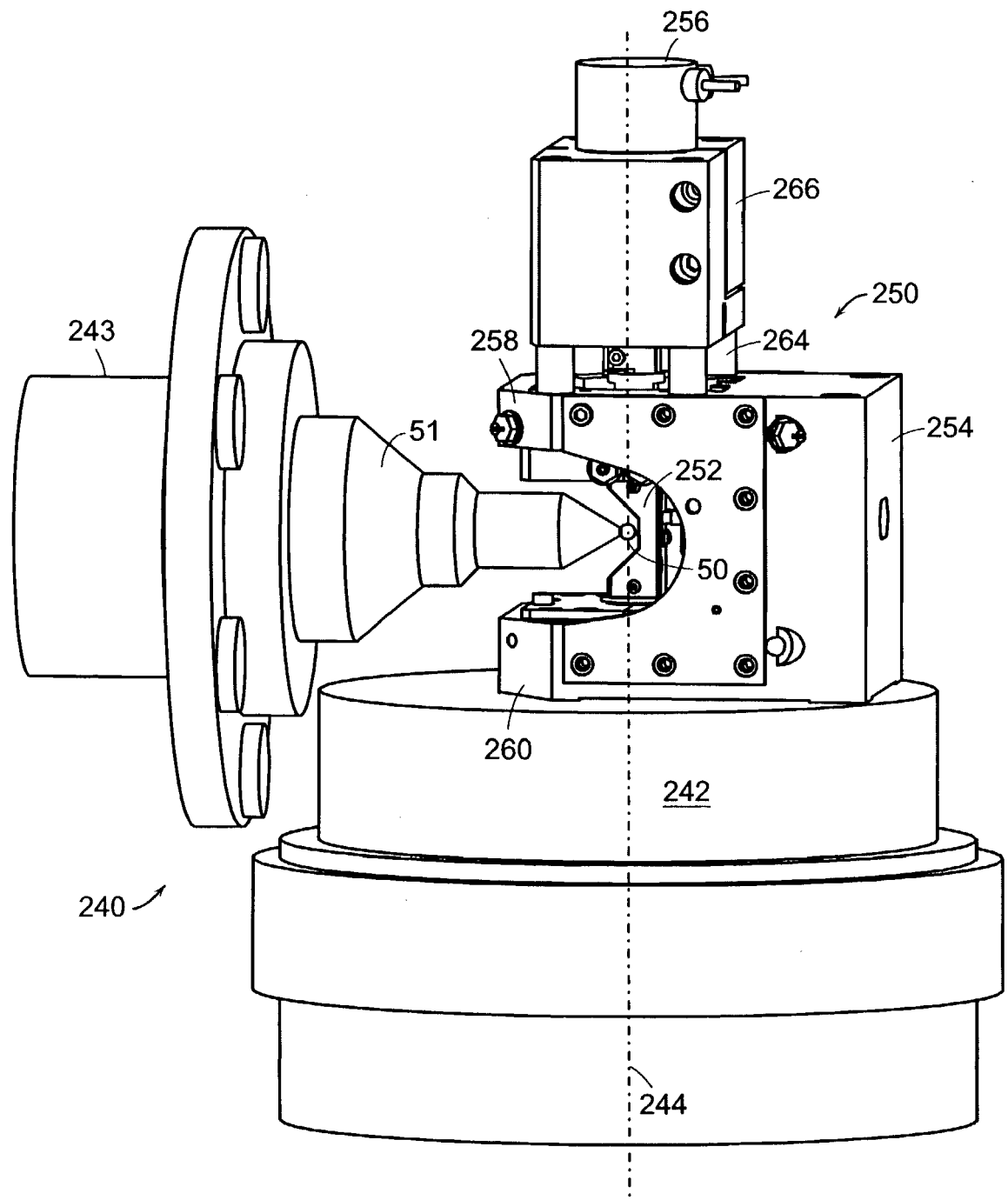
FIG. 18 is a side view of a workpiece on a spindle of a lathe with a rotary fast tool servo of an alternative embodiment on a rotary base according to the invention.

The differential screw assembly 66 is mounted in the upper portion 60 of the base 48. The upper portion 60 of the base 48 is joined to lower portion 62 of the base 48 by the flexure hinge 64. The flexure hinge 64 extends across the swing arm base from the left side of the base 48 to the right such that flexing of the flexure hinge 64 causes up/down repositioning of the cutting tool 90. By rotating the upper portion 60 of the base 48 about the flexure hinge 64, the cutting tool is adjusted vertically relative to the workpiece using the differential screw assembly 66. The lower portion 62 provides a surface 226 for the tip 214 of the differential screw assembly 66 to contact. The lower portion 62 has a mounting surface 228 for attaching the rotary fast tool servo assembly 40 to a machine tool 240, as seen in FIG. 18.

A preload spring maintains contact between the tip 214 of the differential screw assembly 66 and the surface 226 of the lower base 62. Adjustments of the coarse adjustment screw and fine adjustment screw cause the tip 214 to bear against the surface 226 of the lower base 62 causing a rotation of the upper portion 60 of the swing arm base 48 around an axis that is parallel to the long axis of the flexure hinge 64 and substantially at the center of the flexure hinge. This rotation of the upper portion 60 of the swing arm base 48 causes the cutting tool edge 96 to change elevation relative to the workpiece 50.

In a preferred embodiment of the present invention, a one degree rotation of the coarse adjustment screw 216 causes a 5 µm change in elevation of the cutting tool edge 96. An upper clamping feature 232 in the swing arm base 48 allows for enabling and disabling of the coarse adjustment screw 216. In a preferred embodiment, a one degree rotation of the fine adjustment screw 218 causes a 0.021 μm (21 nm) change in elevation of the cutting tool edge 96. A lower clamping feature 234 in the swing arm base 48 is used to hold the differential screw assembly 66 in the upper portion 60 of the swing arm base.

In the present embodiment of the rotary fast tool servo, the differential screw assembly 66 provides a ±1.27 mm of change in elevation of the cutting tool edge 96. Alternative embodiments of differential screw assemblies are available that provide other greater or lesser changes in elevation of the cutting tool edge 96.

In a preferred embodiment of the rotary fast tool servo 40, the swing arm 102 is configured to couple an actuator 68 which is mounted to the upper portion 60 of the swing arm base 48 with a thermally insulating spacer. The thermally insulating spacer, as shown in the next embodiments restricts the flow of heat from the actuator 68 into the swing arm base 48. An enclosure, as shown in the next embodiment, around the actuator 68 allows for the controlled removal of the heat generated by the actuator during use, helping to prevent the heat from entering the rest of the machine by thermal conduction, convection, and radiation.

Different methods for aligning the axis of rotation of the actuator 68 to the swing arm axis of rotation 46 are possible. One method includes precision machining of the mounting surfaces on the interface hardware between the actuator 68 and the upper portion 60 of the swing arm base 48, and precise alignment of the interface hardware to the swing arm axis of rotation 46 during assembly. Another method includes using a flexible coupling to accommodate misalignment between the actuator 68 and the swing arm 48. A flexible coupling is a well-known device used in the art for transmitting torque between two bodies while accommodating a misalignment between those bodies due to relaxed manufacturing and assembly tolerances.

Damping mechanisms, such as discussed with respect to the next embodiments, can be added between the swing arm 104 and the swing arm base 48 to improve the dynamic performance of the fast tool servo. The areas near the upper skirt 192, lower skirt 194, upper hub 110, and lower 112 are possible locations for installing damping mechanisms.

Displacement and rotation sensors, such as discussed with respect to the next embodiments, can be added between the swing arm 102 and the swing arm base 48 to provide real-time measurement data on the location and angular orientation of the swing arm relative to the swing arm base during operation of the fast tool servo. The areas near the upper skirt 192, lower skirt 194, and between the back surface 158 of the swing arm 102 and the swing arm base 48 are possible locations for installing displacement and rotation sensors. Additionally, the actuator 256 can be equipped with rotation sensors to provide real-time measurement data on the location and angular orientation of the swing arm 102 relative to the swing arm base 48.

Referring to FIG. 18, an alternative fast tool servo system 250 is shown in accordance with a preferred embodiment of the present invention. The fast tool servo 250 has a swing arm assembly 252, a base 254, and an actuator 256. The base 254 of the fast tool servo 250 is located on a rotating table 242 of the machine tool 240, such as an auxiliary spindle on a two-axis precision lathe. The rotating table 242 rotates about an axis of rotation 244 which is not coincident with the axis of rotation of the swing arm. Depending on the radius of curvature of the workpiece, the axis of rotation of the rotating table can be located inside or outside of the workpiece. For example, the workpiece shown in FIG. 18 can have the rotating table axis pass through the center of the small, spherical workpiece. To generate a surface on the workpiece that has a radius of curvature larger than the diameter of that workpiece, the axis of rotation can be located outside the workpiece. The workpiece 50 is retained by a workpiece holder 51 attached to a spindle 243 on the machine tool 240.

The base 254 has an upper portion 258 and a lower portion 260 which overlie and underlie, respectively, the predominant portion of the swing arm assembly 252. The actuator 256 is coupled to the swing arm assembly 252. The actuator 256 is mounted to the upper portion 258 of the base 254 with a plurality of thermally insulated spacers 264. The thermally insulating spacers 264 restrict the flow of heat from the actuator 256 into the base 254. In addition, the fast tool servo 250 has an enclosure 266 around the actuator 256 that allows for controlled removal of heat generated by the actuator 256 during use, helping to minimize and preferably prevent the heat from entering the rest of the fast tool servo system by thermal conduction, convection, and radiation.

Figure 19:
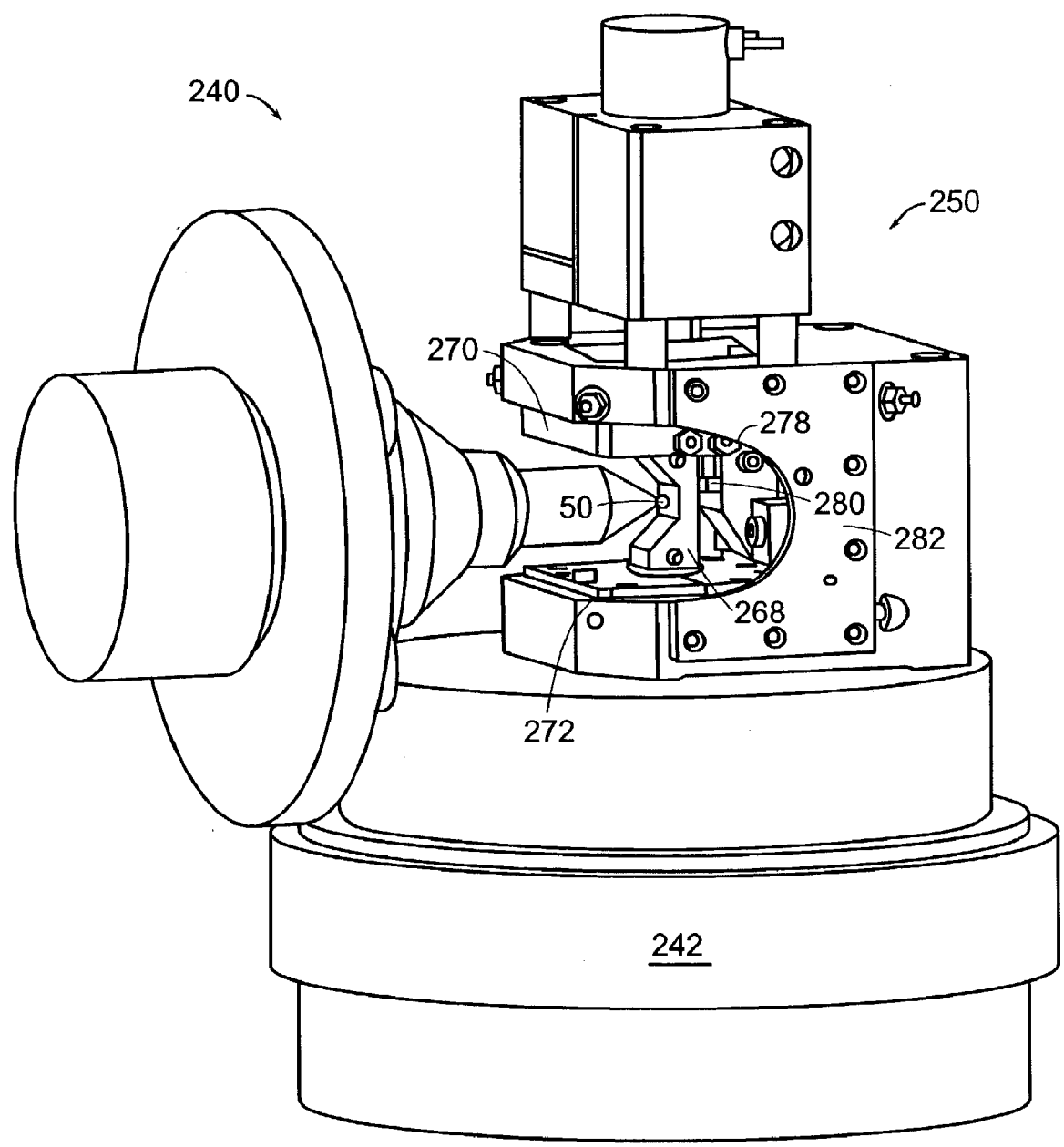
FIG. 19 is a view of a workpiece on a spindle with a rotary fast tool servo on a rotary base in accordance with a preferred embodiment of the present invention.
Figure 20:
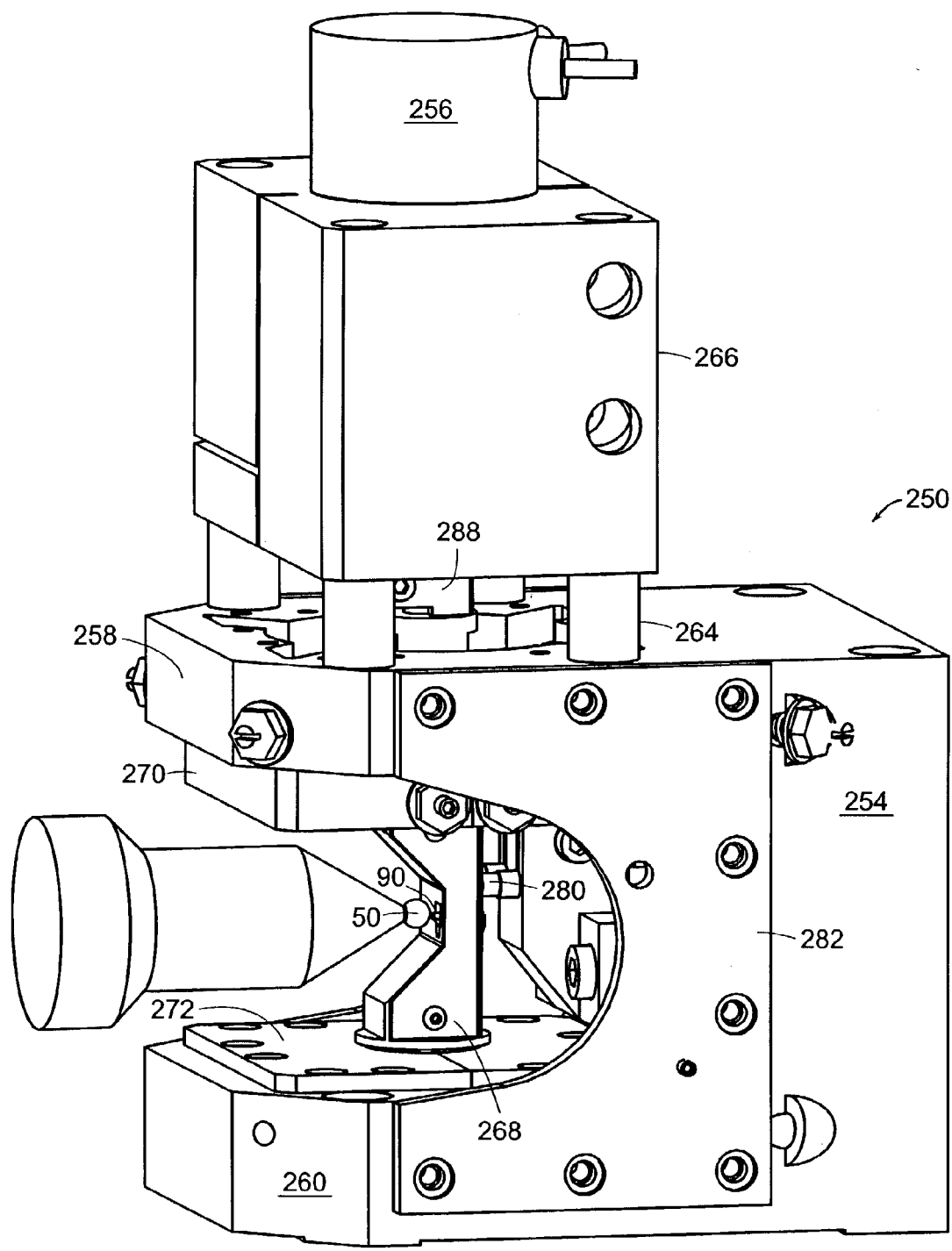
FIG. 20 is a skewed view of a rotary fast tool servo with a workpiece on a workpiece holder in accordance with a preferred embodiment of the present invention.

Another view of the fast tool servo 250 on the rotating table 242 of the machine tool 240 is shown in FIG. 19 in accordance with a preferred embodiment of the present invention. As best seen in FIG. 20, the cutting tool 90 is shown engaging the workpiece 50. As in the previous environment, the cutting tool 90 is carried in a slot 139 (best seen in FIG. 21) in a swing arm 268 of the swing arm assembly 252. In addition similar to the previous embodiment, the fast tool servo 250 has an upper chip shield 270 and a lower chip shield 272 that protect the flexure blades from being interfered with by chips or debris coming off of the workpiece 50 during the machining process.

The motion of the swing arm 268 of the swing arm assembly 252 is measured by a pair of sensors 280. The motion of the swing arm 268 is limited by a plurality of hard stops 278 as described hereinbefore. The sensors 280 are shown behind the swing arm 252, and can be better seen in FIG. 20.

Figure 22:
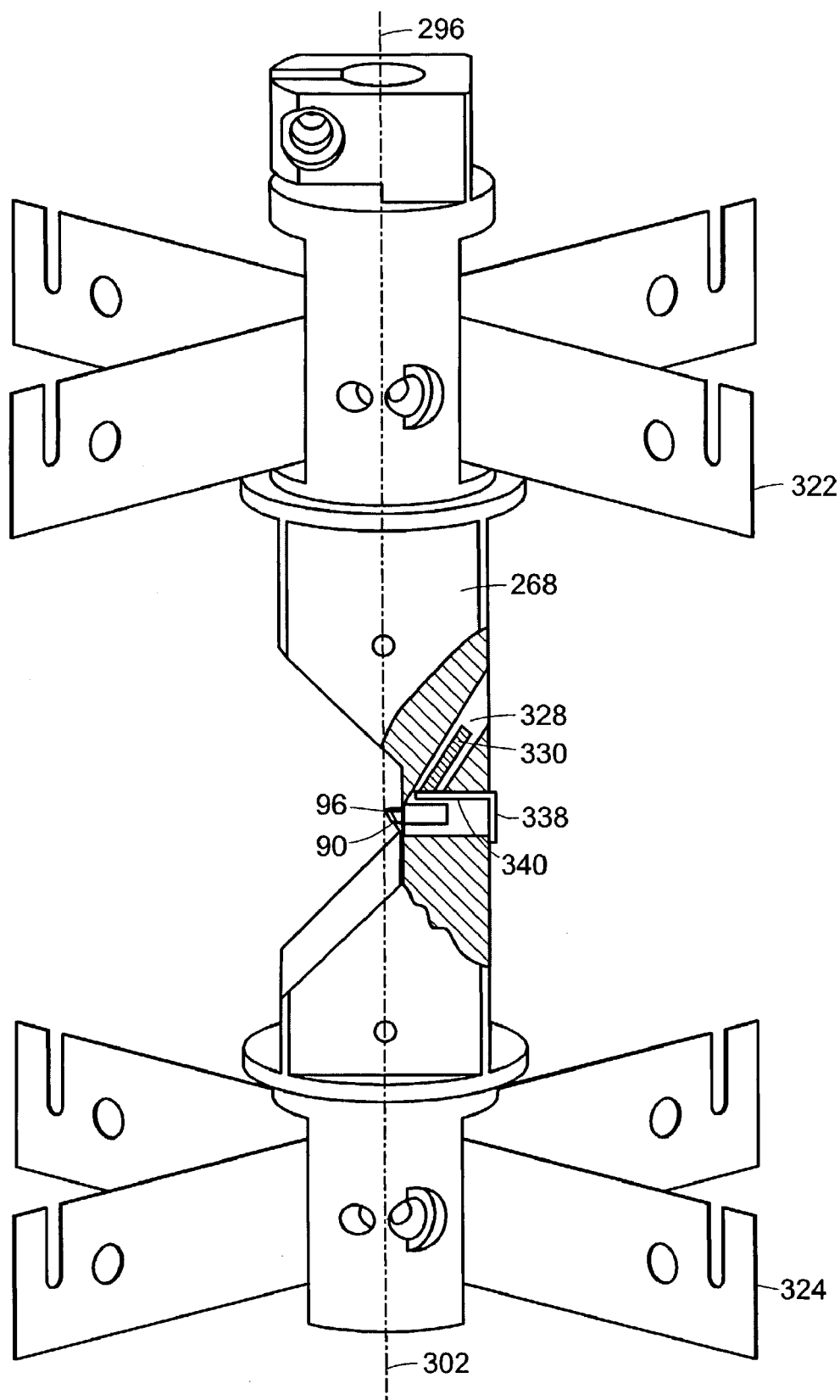
FIG. 22 is a sectional view of the swing arm with a cutting tool and retention mechanism in accordance with a preferred embodiment of the present invention.

FIG. 20 is a view of the fast tool servo 250 without showing the rotating table 242 of the machine 240 upon which it sits. The sensors 280 in this embodiment are a pair of eddy current sensors that measure rotation of the swing arm 268 around its centerline 296, and translation of the swing arm in a direction perpendicular to its front/back plane 302 as seen in FIG. 22. It is recognized that the sensors 280 that determine the rotation of the swing arm 268 can be other sensors such as, for example, but not limited to, capacitance gauges or other types of sensors capable of measuring small mechanical displacements that change at high frequency. In addition, the fast tool servo 250 has a pair of panels or side stiffeners 282 that extend from the upper base portion 258 to the lower portion 260 and provide for stiffening.

Figure 28:
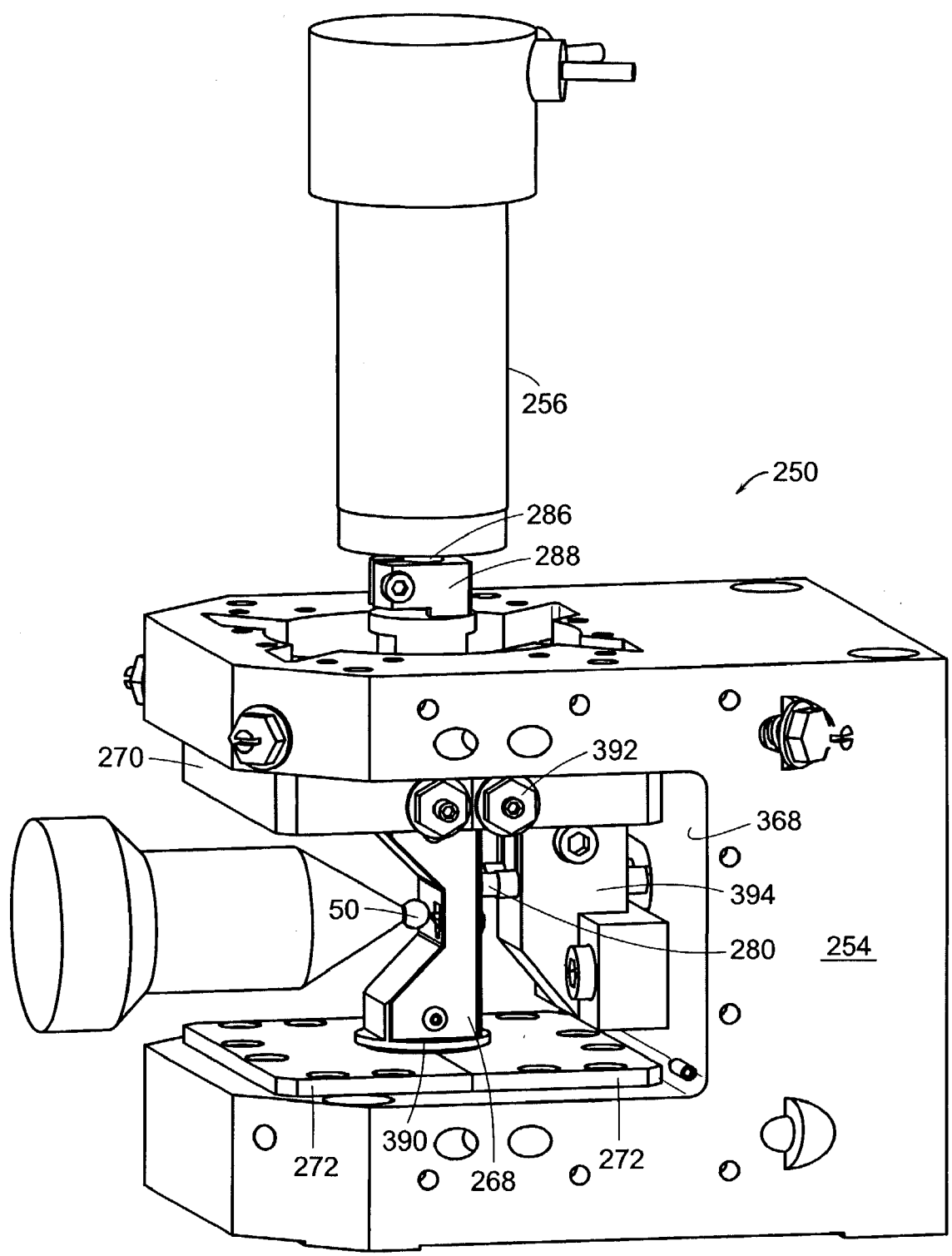
FIG. 28 is a side perspective view of the rotary fast tool servo system showing an actuator connected to the swing arm in accordance with a preferred embodiment of the present invention.

The actuator 256 is shown to be mounted to the upper portion 258 of the base 254. The thermally insulating spacers 264 support and thermally insulate the actuator 256 from the base 254 therein restricting the flow of heat from the actuator 256 into the base 254. In addition, the actuator 256 is surrounded by the enclosure 266 that allows for controlled removal of heat generated by the actuator 256 during use. The interface between the actuator 256 and the swing arm assembly 252 can be seen. The actuator 256 has an output shaft 286, as best seen in FIG. 28, which extends downwardly and is received by a clamp 288 on the swing arm assembly 252, as best seen in FIG. 21.

Figure 21:
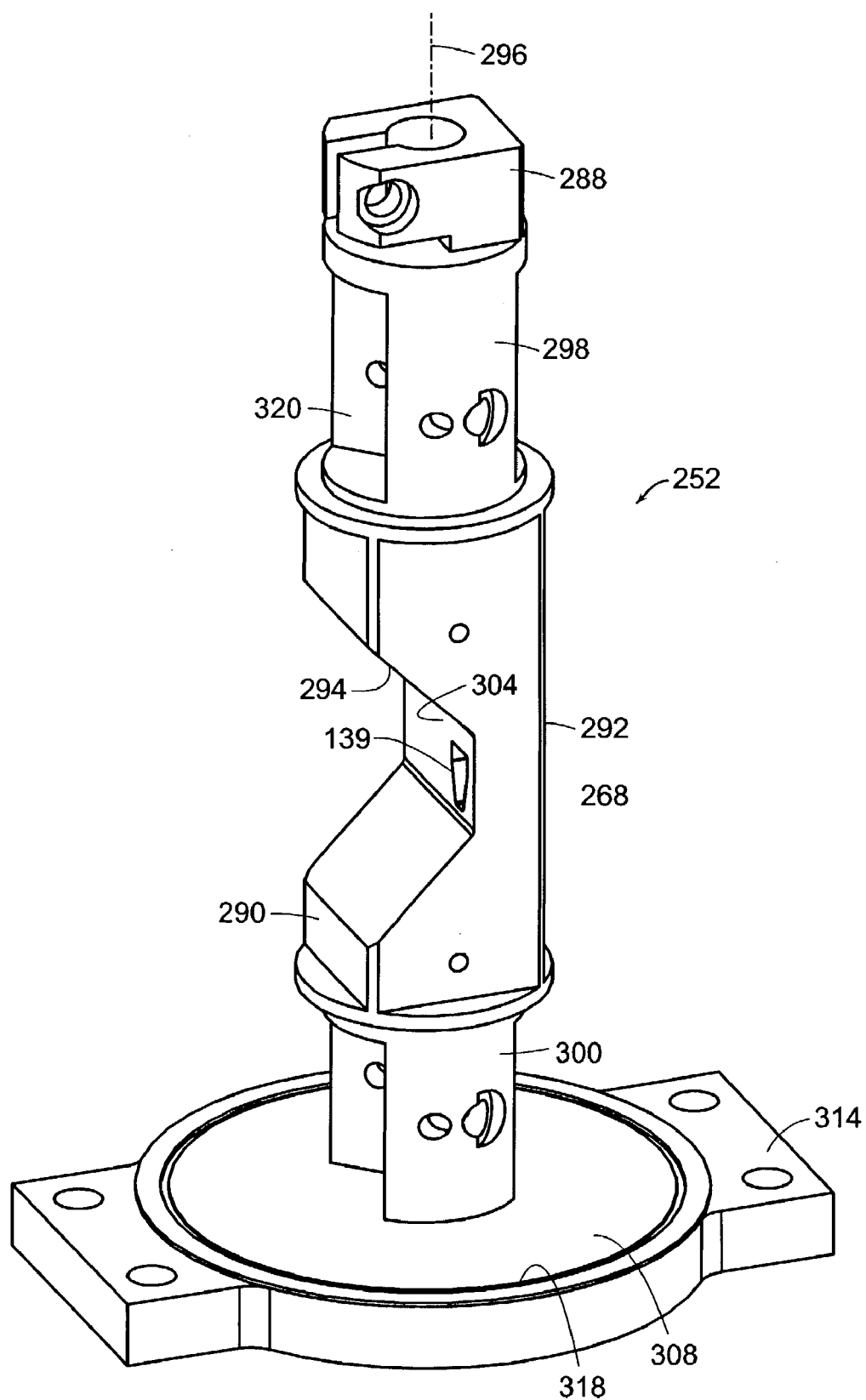
FIG. 21 is a perspective view of a swing arm with a damper plate in accordance with a preferred embodiment of the present invention.

Referring to FIG. 21, the swing arm assembly 252 has a swing arm 268 that has a front face 290, a rear face 292, and a clearance cut 294. The swing arm 268 has an axis of rotation 296 that nominally coincides with the long axis of the swing arm. The swing arm 268 has an upper hub 298 and a lower hub 300. The clearance cut 294 is located approximately midway between the upper hub 298 and the lower hub 300. The clearance cut 294 extends from the front face 290 of the swing arm 268 through the axis of rotation and slightly beyond. A front/back plane 302, as best seen in FIG. 22, extends through the axis of rotation 296 and is parallel to the front face 290. A back clearance surface 304 of the swing arm 268 is parallel to and spaced from the front/back plane 302. The clearance cut 294 allows the cutting tool edge 96 and a small portion of the cutting tool 90 to protrude from the back clearance surface 304 of the swing arm 268, as seen in FIG. 22, and allows the workpiece to extend into the swing arm 268 as much as possible.

As will be described in further detail hereinafter, the fast tool servo system 250 has several mechanisms for damping of motion. There is a desire to dampen the motion so that unintentional motion does not propagate. With respect to this, the fast tool servo system 250 has a damping plate 308 that is secured to the lower hub 300 of the swing arm 268. The damping plate 308 is interposed between the lower portion 260 of the base 254 and a bottom plate 314. The bottom plate 314 has a circular groove 318 that receives the damping plate 308.

A viscous fluid such as grease, or a viscoelastic material, is constrained between the damping plate 308 and the lower portion 260 of the base 254 and the bottom plate 314. Rotation of the swing arm 268 causes relative motion between the damping plate 308 and the lower portion 260 of the base 254 and the bottom plate 314, producing a shear force in the grease or viscoelastic material that dissipates energy associated with rotation of the swing arm 268.

In an alternate embodiment damping of unwanted motion between the swing arm 268 and the base 254 is accomplished by the relative motion of an electrically conducting plate carried by one through a magnetic field that is referenced to the other resulting in eddy current losses in the plate.

As in the previous embodiments, the swing arm 268 is secured to the base 254 by a plurality of flexure blades. The lower and upper hubs 300 and 298 each have a pair of sectors of a cylinder or pie slice shaped grooves 320 for receiving the flexure blades, as seen in FIGS. 21-24.

Figure 23:
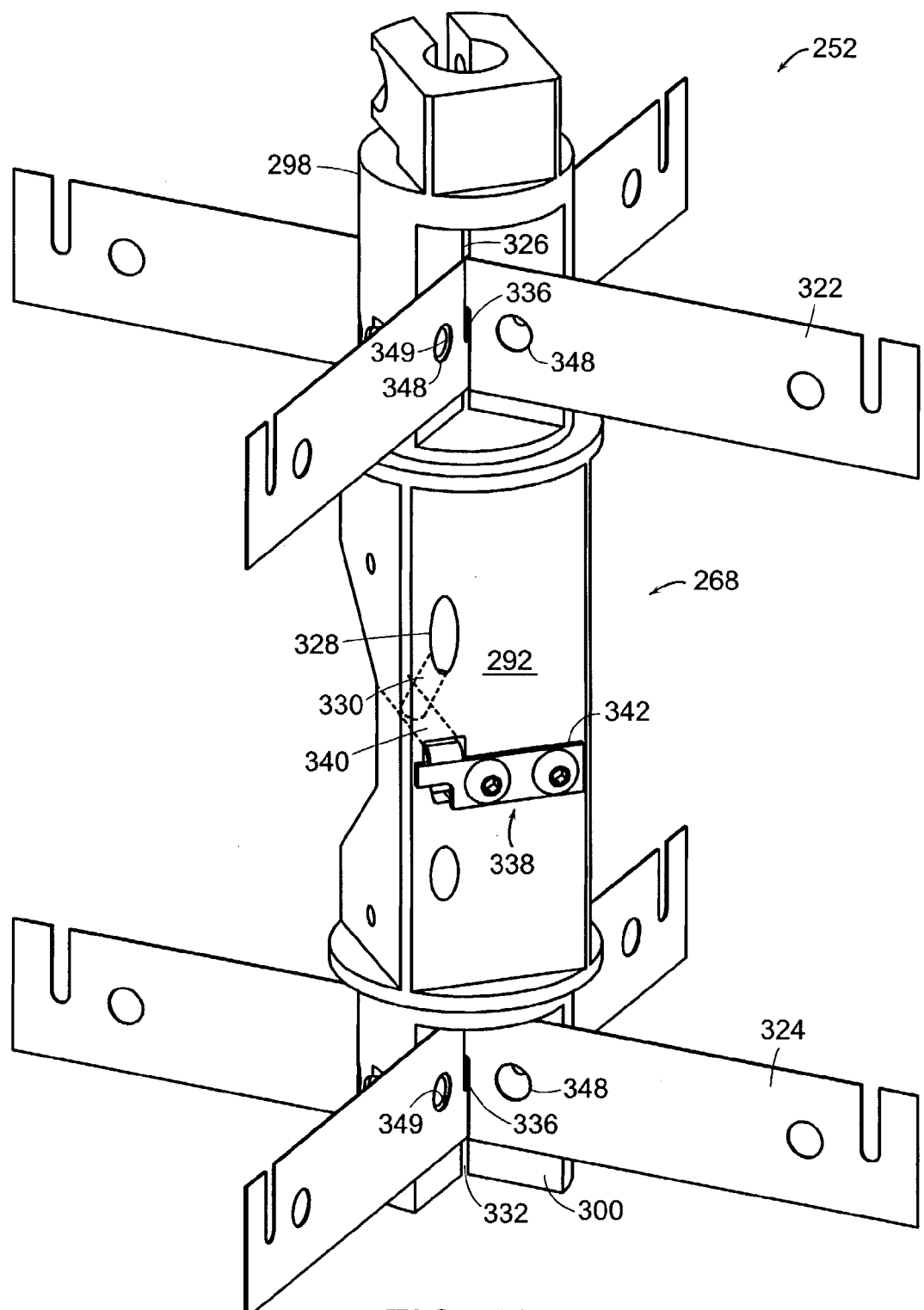
FIG. 23 is a rear view of the swing arm showing the tool clamp flexure of the retention mechanism in accordance with a preferred embodiment of the present invention.

Referring to FIG. 22, the swing arm assembly 252 has a pair of upper flexure blades 322 and a pair of lower flexure blades 324 secured to the swing arm 268. The pair of upper flexure blades 322 intersect each other at a groove 336 in each blade at a slot 326 in the upper hub as best seen in FIG. 23. The pair of lower flexure blades 324 intersect in a similar manner.

Still referring to FIG. 22, the swing arm 268 is shown with a portion broken away. The swing arm has a bore 328 for receiving a screw 330 for retaining the cutting tool 90 as described below with reference to FIG. 23. The center point 98 as best seen in FIG. 2C on the cutting tool edge 96 lies nominally in the front/back plane 302 of the swing arm.

Referring to FIG. 23, a back perspective view of the swing arm assembly 252 is shown. The lower pair of flexure blades 324 are positioned in the lower hub 300 by sliding them up into a slot 332 in the lower hub 300. The upper pair of flexure blades 322 are slid into position one at a time into the slot 326 in the upper hub 298 wherein the blade extending from the left front to the right rear in FIG. 23 is inserted first in position and the other blade is slid above and slid down such that the center grooves slots 336 engage. The center slots 336 are similar to that shown in FIG. 8 as related to the first embodiment.

The swing arm assembly 252 has a tool clamp flexure 338 that has a forward arm 340 as seen in FIG. 22 that is biased by the screw 330 into engagement with the cutting tool 90. Referring back to FIG. 23, the tool clamp flexure 338 has a back 342 that is secured to the rear face 292 of the swing arm 268. The screw 330 provides for biasing the forward arm 340 to secure the tool similar to the arrangement in FIG. 7 as related to the first embodiment. In the alternative, a screw can pull the cutting tool 90 in a downward direction using the lower hole.

Figure 24:
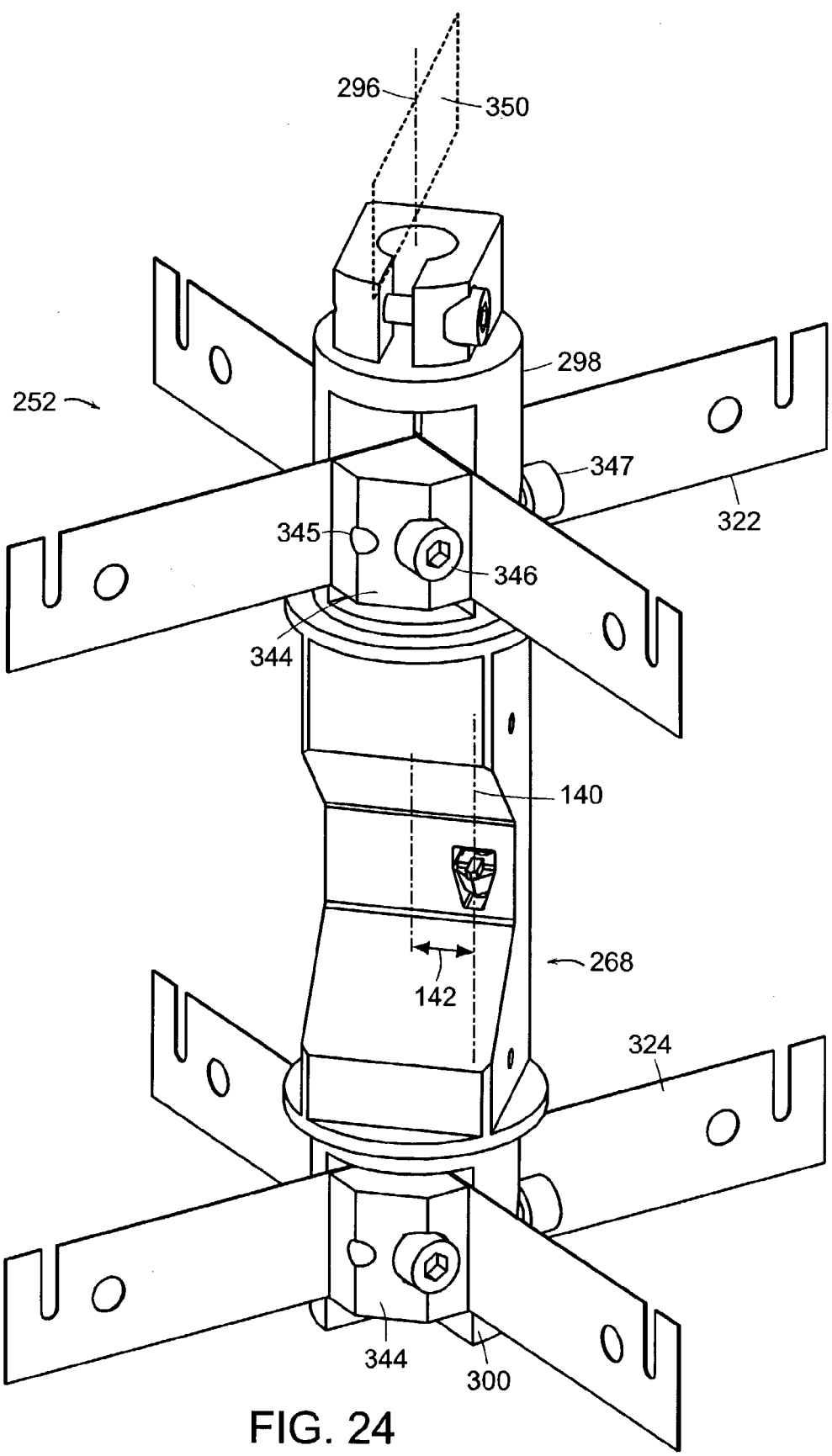
FIG. 24 is a front view of the swing arm showing a clamp mechanism for the pair of flexures in accordance with a preferred embodiment of the present invention.

FIG. 24 shows a front perspective view of the swing arm 268 with the upper pair of flexure blades 322 secured to the upper hub 298 and the lower pair of flexure blades 324 secured to the lower hub 300. The swing arm assembly 252 has a pair of blocks 344 associated with each of the upper hub 298 and the lower hub 300 for securing the respective flexure blades 322 and 324. A fastener 346 extends through the block 344 through a hole 348 in the flexure blade and into a threaded hole 349 in the hub, and a fastener 347 extends through a clearance hole in the hub into a threaded hole 345 in the block 344 as seen in FIG. 23, for securing the flexure blades 322 or 324 between the block 344 and the surface of the sector groove of the hub.

The swing arm 268 has a right/left plane of symmetry 350 that contains the swing arm axis of rotation 296 and is perpendicular to the front/back plane 302 as shown in FIG. 22. The right/left plane of symmetry 350 is analogous to the right/left plane of symmetry 136 as shown in FIG. 5. The slot 138, 139 in the swing arm 268 that receives the cutting tool 90 has a plane of symmetry 140 that divides the slot into a right half and a left half portion. The slot 138, 139 is located in the swing arm 268 approximately midway between the upper hub 298 and the lower hub 300. The slot plane of symmetry 140 is parallel to the right/left plane of symmetry 350 and is offset from the swing arm axis of rotation 296 by a distance equal to the offset radius 142. The center point on the cutting tool (analogous to the center point 98 in FIG. 2C) is in the plane of symmetry 140 of the slot 138, 139 and therefore offset from the swing arm right/left plane of symmetry 350 by a distance equal to this offset radius 142.

Figure 25:
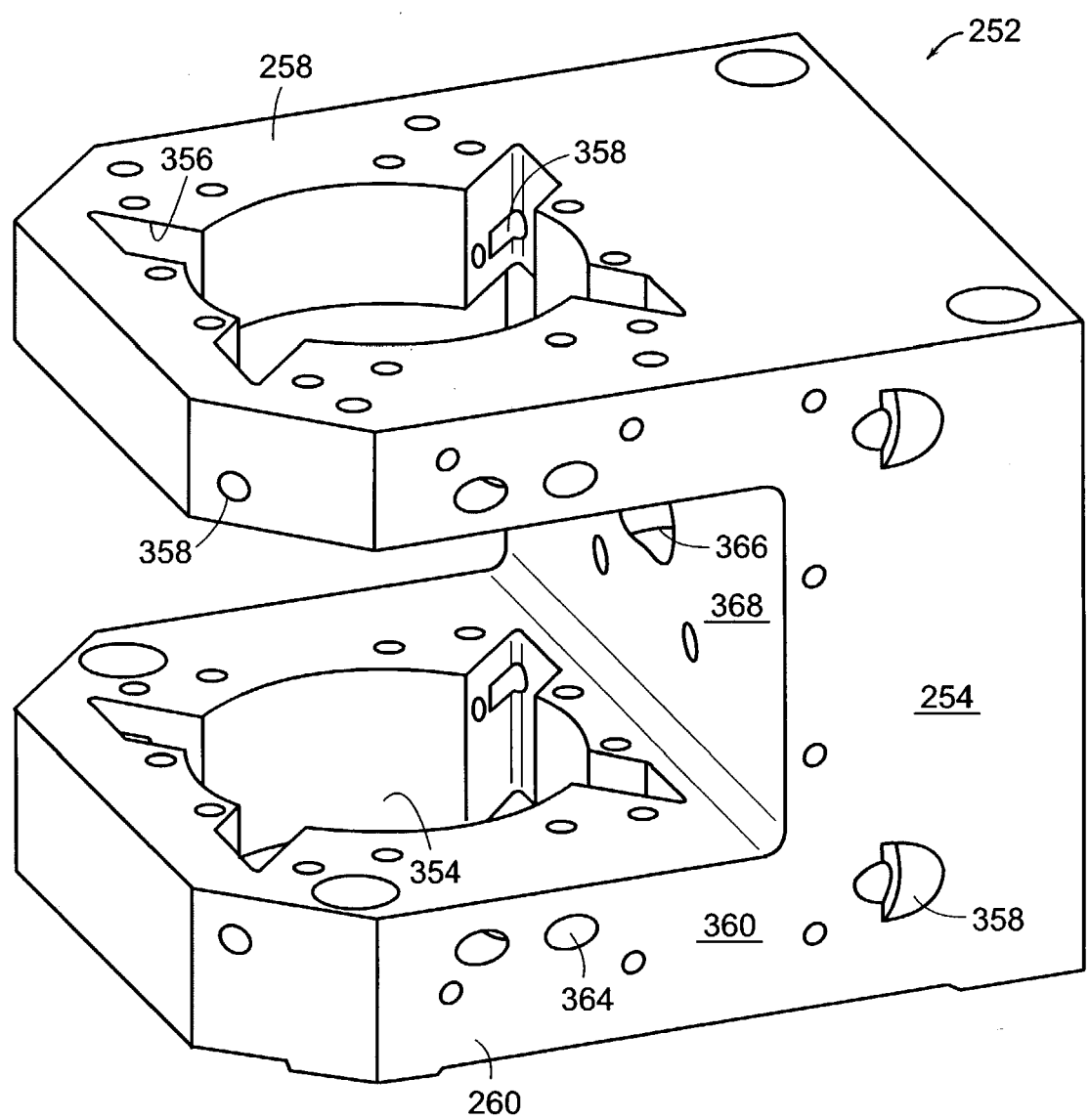
FIG. 25 is a perspective view of the base of the rotary fast tool in accordance with a preferred embodiment of the present invention.

FIG. 25 is a perspective view of the base 254 of the fast tool servo system 250. The base 254 has the upper portion 258 and the lower portion 260 with a generally circular cutout 354 with additional portions cutout 356 for forming an "x" shape for receiving the ends of the flexure blades 322 and 324. The "x" shape is oriented to maximize the clearance between the base 254 and the workpiece 50. In a preferred embodiment the portions cutout 356 are oriented so that the flexure blades 322 and 324 are at a 45° angle from the surface-normal of a workpiece at the point of contact between the cutting tool 90 and workpiece 50.

Figure 26:
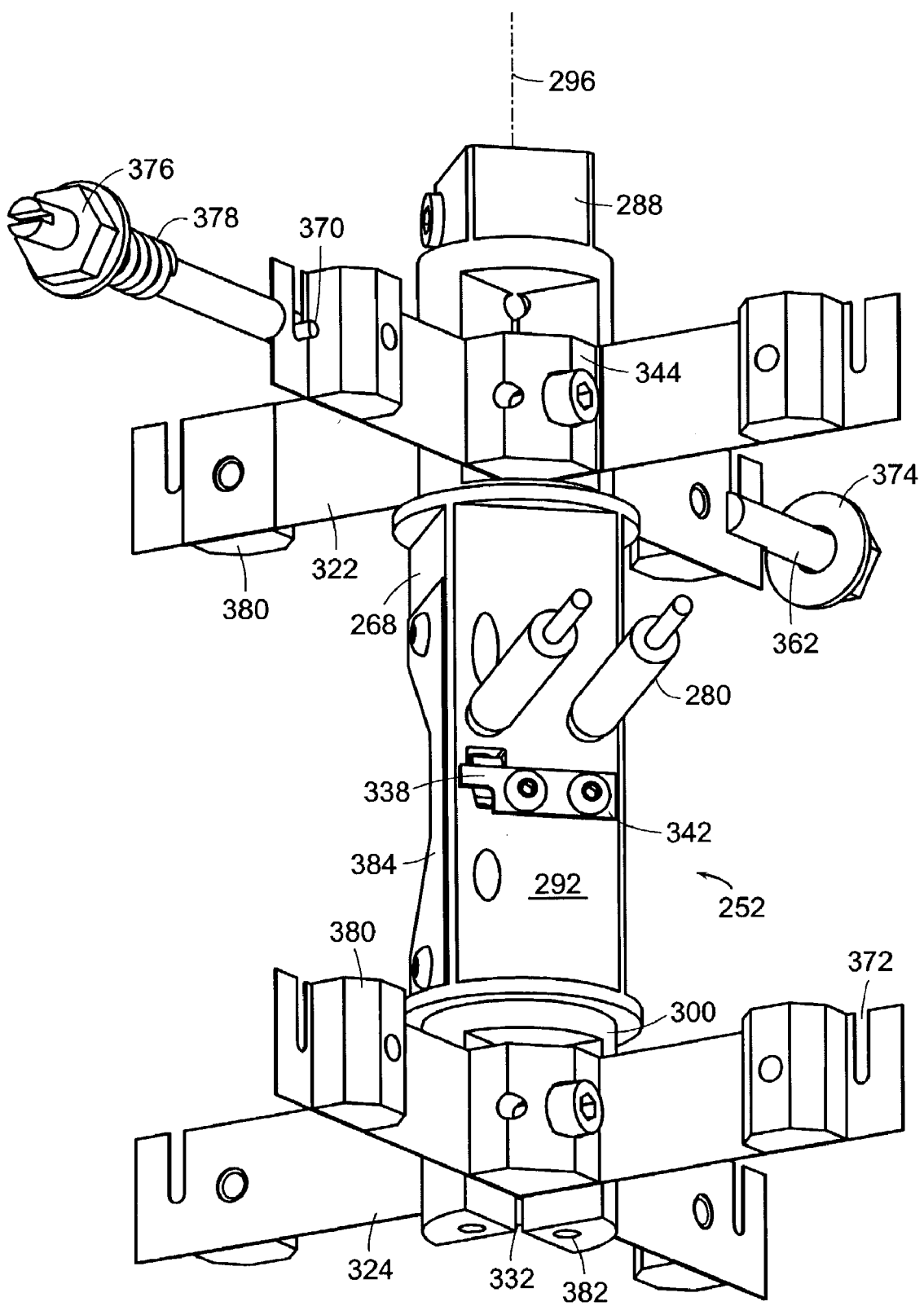
FIG. 26 is a back bottom perspective view of the swing arm with flexure blades, a tensioning device, and sensors in accordance with a preferred embodiment of the present invention.
Figure 27:
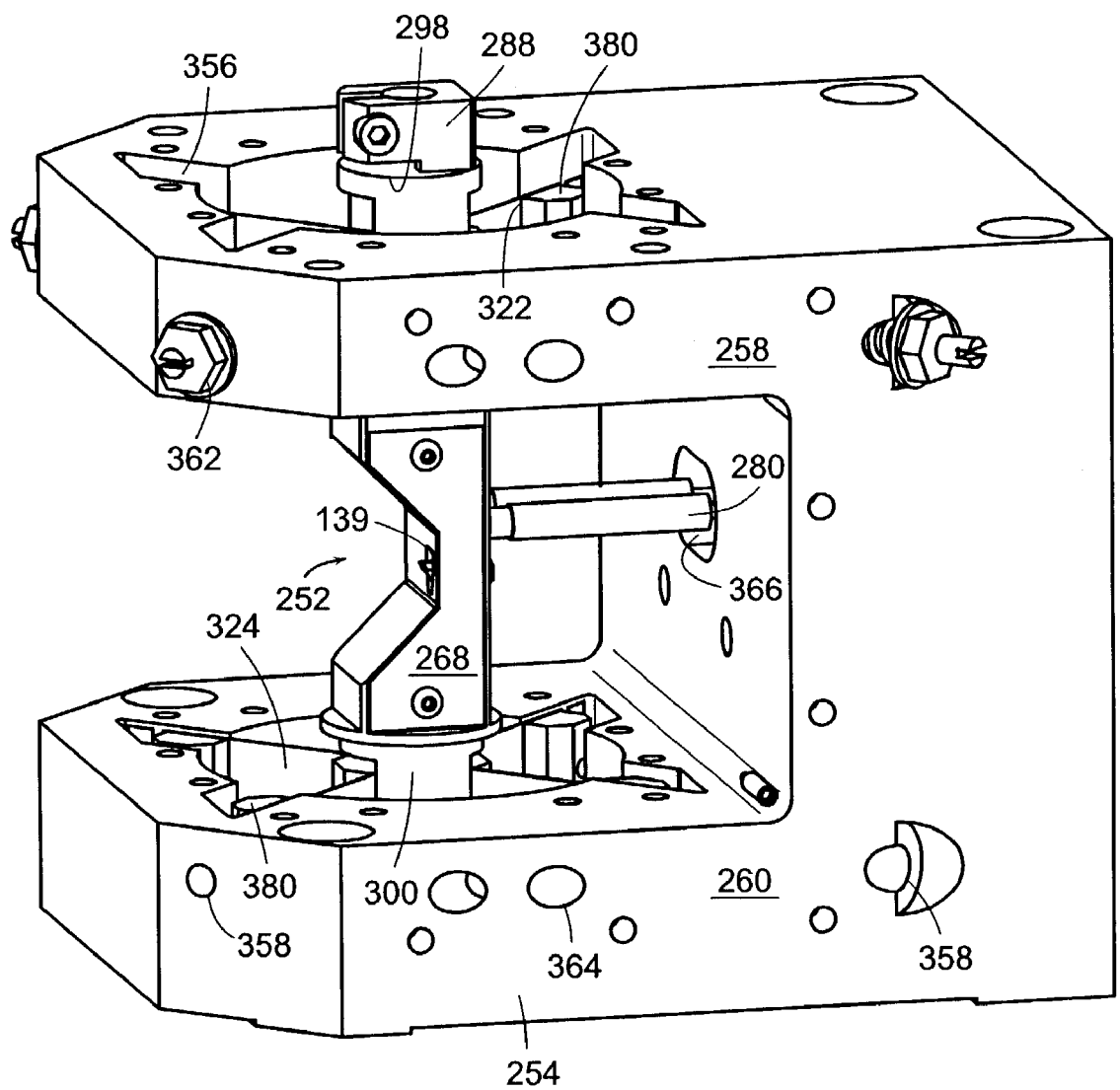
FIG. 27 is a side perspective view of the base with the swing arm in accordance with a preferred embodiment of the present invention.

A plurality of holes 358 extend from the cut-out portions 356 to the outer surfaces 360 of the upper and lower portions 258 and 260 of the base 254 to receive a plurality of tensioning rods 362 as shown in FIG. 26. Additional holes 364 extend from the cut-out portion 356 to the outer surface 360 of the base 254 in order to allow the flexure blades to be secured by a plurality of clamping blocks 380 after being properly tensioned as seen in FIG. 27. The base has an opening 366 on a back surface 368 behind the cylindrical cut-out 354 that is used in conjunction with mounting the sensors 280.

Referring to FIG. 26, a back bottom perspective view of the swing arm assembly 252 including the flexure blades 322 and 324 with one of the four tensioning devices is shown in accordance with a preferred embodiment of the present invention. Each of the upper and lower flexure blades are placed in tension prior to fixing the blades 322 and 324 to the base. One of the upper flexure blades 322 is shown with a pair of tensioning rods 362. Each tensioning rod 362 has a pin 370 that is received in a slot 372 in the flexure blade 322 or 324. The tensioning rod 362 has a washer 374 and a threaded nut 376 at the other end which engage the base 254 in pulling the ends of the flexure blades 322 away from each other (i.e., place the blade in tension). One of the tensioning rods 362 has a spring device 378 for providing a finely controlled tension force on the flexure blades 322 or 324 as the nut 376 is turned. Differentially adjusting the nuts 376 on a pair of tensioning rods 362 causes displacement of the swing arm axis of rotation 296, in a direction along the long axis of that pair of tensioning rods, relative to the base 254. By differentially adjusting each of the four pairs of tensioning rods 362 the orientation and location of the swing arm axis of rotation 296 can be adjusted relative to the base 254 before the outer ends of the flexure blades 322 and 324 are fixed to the base with the clamping blocks 380. The clearance hole in the flexure blade is large enough to accommodate this adjustment without interference.

Each flexure blade 322 has a pair of clamping blocks 380 mounted to the blade that are received within the cut-out portion 356 of the base 254. These blocks 380 each receive a fastener to secure the flexure blades 322 and 324 to the base 254 in tension after the swing arm axis of rotation 296 is aligned to the base 254 and the flexure blades are tensioned.

In addition, still referring to FIG. 26, the lower portion of the lower hub 300 has a pair of attachment holes 382 below where the lower flexure blades 324 are slid into position in the slot 332. If the damping plate 308 is attached, such as shown in FIG. 21, the damping plate 308 is attached to the lower hub 300 using these attachment holes 382.

On each side of the center portion of the swing arm 268 there are disposed a pair of plates 384, one shown in FIG. 26, for help in damping unwanted motion of the swing arm 268. The back 342 of the tool clamp flexure 338 is secured to the rear face 292 of the swing arm 268. In a preferred embodiment, the eddy current sensors 280 are shown engaging the rear face 292 of the swing arm 268.

Referring to FIG. 27, the swing arm assembly 252 is positioned in the base 254, the hubs 298 and 300 are located in their respective cylindrical cut-out 354 portion. The clamping blocks 380 for securing the swing arm assembly 252 to the base 254 are shown such that the flexure blades 322 and 324 are interposed between the blocks 380 and the wall of the additional cutout 356. The tensioning rods 362 are shown extending through the hole 358 in the upper portion 258 of the base 254. The additional holes 364 are used to secure fasteners to the clamping block 380 to retain the flexure blades 322 and 324.

The sensors 280 are shown extending from the opening 366 in the base 254 to the swing arm 268. The tensioning rods 262 are shown in the upper portion; similar rods are used in the lower portion but are not shown in this figure. After the flexure blades 322 and 324 are fixed to the base 254 by the clamping blocks 380, the tensioning rods 362 can be loosened by backing off nuts 376, although it is generally not necessary to do so. The cutting tool 90 is projecting from the slot 138, 139 in the swing arm 268.

Referring to FIG. 28, the upper chip shield 270 and the lower chip shield 272 are shown secured to the base 254. The swing arm 268 has a pair of annular rings or skirts 390 that interact with the shields 270 and 272 as described with respect to the first embodiment.

The swing arm assembly 252 has a plurality of hard stops 392. The hard stops 392 are retained by the upper chip shield 270. The hard stops 392 prevent excessive rotation of the swing arm 268 that can damage the flexure blades 322 and 324, and work identically as described and shown in the embodiment illustrated in FIG. 14. Referring to FIG. 14, a small gap 213 between an end of each hard stop 392 (212) and the swing arm 268 (102) allows normal rotation of the swing arm. The hard stops 392 (212) act in pairs to limit the rotation angle of the swing arm 268 (102) to prevent damage to the upper and lower pairs of flexure blades 322 and 324. Excessive rotation of the swing arm 268 (102) causes closure of a pair of gaps 213 that limits rotation of the swing arm.

The sensors 280 are shown in a mounting block 394 mounted to the back face or back surface 368 of the base 254. The output shaft 286 of the actuator 256 is held by the clamp 288 to connect the actuator 256 to the swing arm assembly 252. It is recognized that a flexible coupling can be used between the output shaft 286 and the swing arm assembly 252 to accommodate misalignment, between the output shaft of the actuator and the swing arm assembly.

Figure 29:
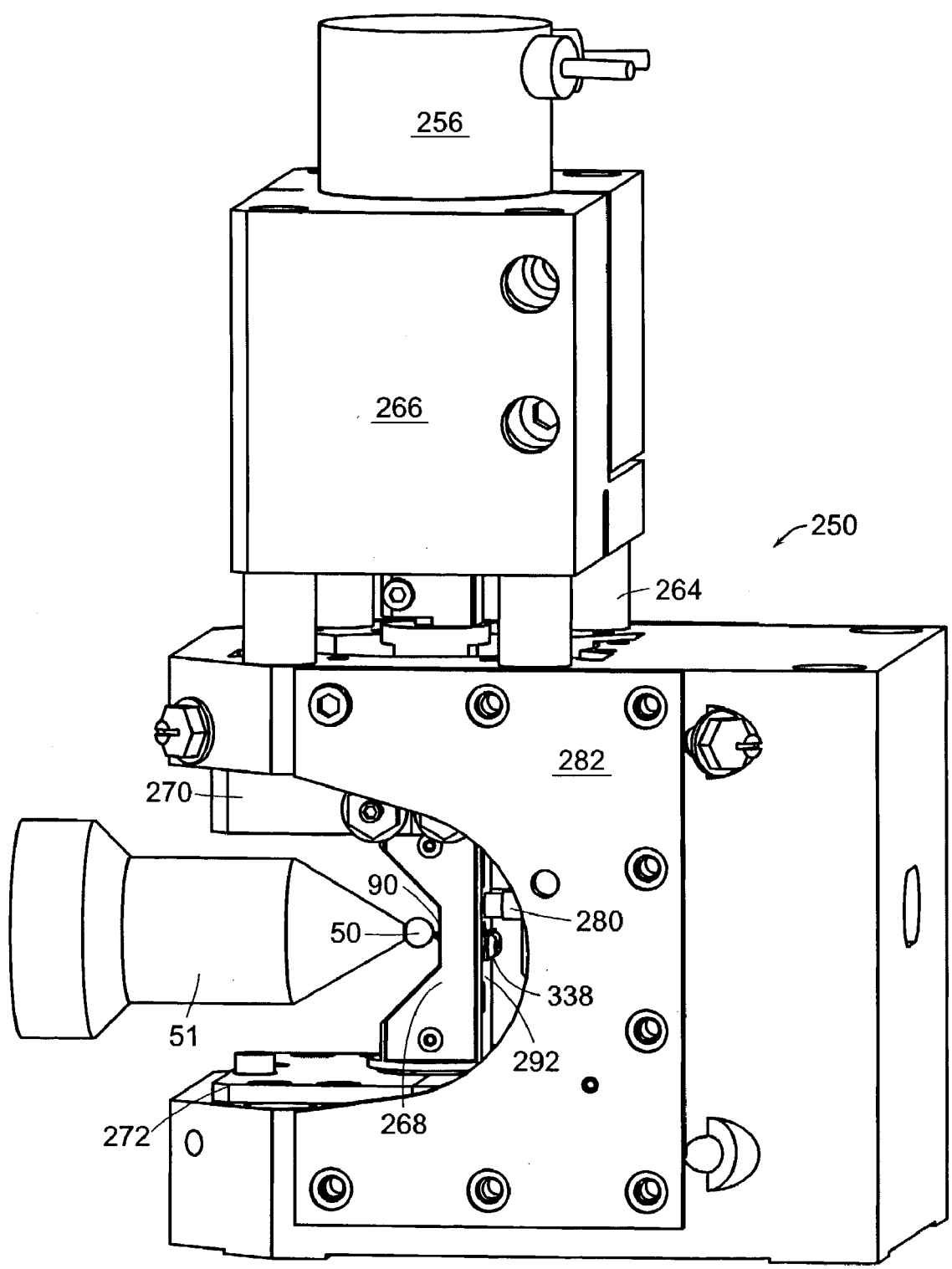
FIG. 29 is a side perspective view of the rotary fast tool servo showing an enclosure encircling the actuator and a side stiffener on the base in accordance with a preferred embodiment of the present invention.

FIG. 29 is a side view of the fast tool servo system 250 in accordance with a preferred embodiment of the present invention and is a view similar to that of FIG. 20. The cutting tool 90 is shown engaging the working piece 50 retained on the workpiece holder 51. The upper chip shield 270 and the lower chip shield 272 protect the upper flexure blades 322 and the lower flexure blades 324, as seen in FIG. 27 from chips and debris that are produced during machining. The sensor 280 is shown engaging the rear face 292 of the swing arm 268. In addition, the tool clamp flexure 338 is shown secured to the swing arm.

The thermal insulating spacers 264 restrict the flow of heat from the actuator 256 into the base 254. The enclosure 266 encircles the actuator 256 to allow controlled removal of heat. The side stiffeners 282 stiffen the base 254.

In a preferred embodiment, the system for a high bandwidth rotary fast tool servo establishes the swing arm axis of rotation 296 and 46 in a vertical direction. Other preferred embodiments of the system can establish the swing arm axis of rotation 296 in a horizontal direction, or any other direction, depending on the intended application of the fast tool servo.

In operation, the fast tool servo 250 is used in conjunction with the machine tool 240, for example, a precision lathe, as shown in FIG. 18. The spindle 243 rotates about a horizontal axis whereas the rotating table 242 rotates about a vertical axis. In addition, one of the units moves in the cross-slide direction that is in and out of the page with respect to FIG. 18 whereas the other one is capable of moving into the in-feed slide position that is in a left and right direction. The position and velocity of the cross-slide and in-feed slide are measured within a precision lathe controller 412. In addition, the rotation position and velocity of the workpiece 50 and the auxiliary spindle (rotary table) 242 can be measured with sensors located in the machined tool 240.

Figure 31:
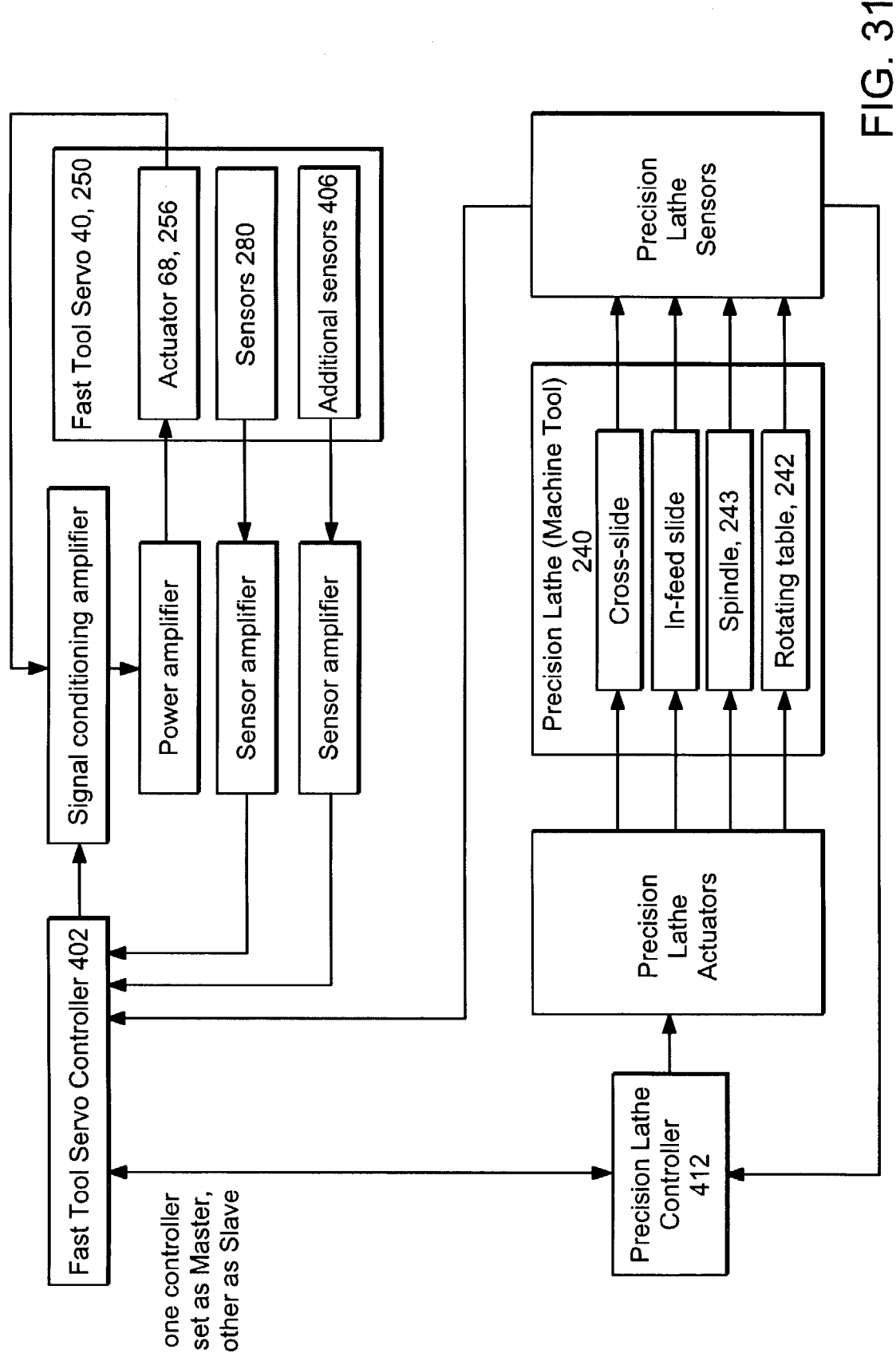
FIG. 31 is a schematic of a control system in accordance with a preferred embodiment of the present invention.

FIG. 31 shows a schematic diagram of the inter-relationship in control of the fast tool servo system 250 with that of a precision lathe or machine tool 240. The machine tool 240 with rotating table 242 such as shown in FIGS. 18, 19, or 32A-C has sensors to determine the position of the workpiece spindle 243 and therein the workpiece 50. The spindle 243 is held by a base unit which is capable of moving in at least one direction. The position of the base unit, the rotational speed and position of the workpiece spindle 243 form inputs into a precision lathe controller 412. The rotating table 242, on which the fast tool servo 250 is mounted, is capable of being moved in a controlled fashion in a direction perpendicular to the direction of the base unit in addition to rotating about a vertical axis. The translational and rotational positions of the rotating table are likewise input into the precision lathe controller 412. In addition to the sensors within the precision lathe 240, the fast tool servo 250 has a plurality of sensors 280 and 406. With respect to the base 254, the position of the swing arm 268 is detected. With sensors such as, for example, sensors 280 as shown in FIG. 29, the rotation position and translation of the swing arm 268 in a direction perpendicular to its front/back plane 118, 302 is detected.

The fast tool servo controller 402 uses feedback information via the sensor amplifiers from the sensors 280 and additional sensors 406 to compute the position and velocity of the tool 90, and produces a command signal for the fast tool servo actuator 256. The command signal from the fast tool servo controller 402 to the actuator 256 is modified by a signal conditioning amplifier that uses feedback from the actuator 256, and the signal indicative of the modified command forms an input to a power amplifier that drives the actuator 256. The fast tool servo controller 402 may synthesize angular velocity information for the swing arm 268 from the position sensors. In an alternate embodiment, a velocity sensor such as, for example, a tachometer is disposed on the actuator.

In a preferred embodiment, the fast tool servo controller 402 is the master controller and the precision lathe controller 412 is the slave controller. Sensors associated with the precision lathe 240 may provide feedback information regarding the position and velocity of the cross-slide, in-feed slide, spindle, and rotating table to both the precision lathe controller 412 and the fast tool servo controller 402. The fast tool servo controller 402 uses the precision lathe sensor information and the fast tool servo sensor information 280 and 406 to compute the spatial relationship between the workpiece 50 and the tool 90. The fast tool servo controller 402 compares the computed relationship between the workpiece 50 and the tool 90 to the desired relationship between the workpiece and the tool, and generates commands to the precision lathe controller 402 to position and orient the cross-slide, in-feed slide, spindle, and rotating table, and also generates commands to the fast tool servo controller to position the tool 90. The precision lathe controller uses feedback information from the precision lathe sensors to compute signals that are issued to the precision lathe actuators to affect the commanded positions and orientations of the cross-slide, in-feed slide, spindle, and rotating table. The fast tool servo controller 402 uses feedback information via the sensor amplifiers from the sensors 280 and additional sensors 406 to compute the position and velocity of the tool 90, and generates a command signal for the fast tool servo actuator 256. The command signal from the fast tool servo controller 402 to the actuator 256 is modified by a signal conditioning amplifier that uses feedback from the actuator 256, and the signal indicative of the modified command forms an input to a power amplifier that drives the actuator 256.

In a preferred embodiment, the fast tool servo system can be a computer numeric control (CNC) machine tool system. A preferred embodiment of the present invention can include a programmable computer.

In an alternate embodiment the precision lathe controller 412 is the master controller and the fast tool servo controller 402 is the slave controller. In this embodiment the fast tool servo controller 402 is responsible for local control of the tool 90 as described with respect to the previous embodiment, and the precision lathe controller 412 is responsible for local control of the precision lathe 240 as described hereinbefore. In this embodiment, the fast tool servo controller 402 may provide the precision lathe controller 412 with information on the position and velocity of the tool 90. The precision lathe controller 412 treats the fast tool servo system 250 as an additional machine axis under its command and synchronizes the position and velocity of the tool 90 with the position and velocity of the cross-slide, in-feed slide, spindle, and rotating table in accordance with the desired relationship between the tool 90 and workpiece 50.

In a preferred embodiment, the fast tool servo controller 402 with an actuator 256 having the capability of two-thousand movements per second and a range of travel of ±0.14 degrees, sensors 280, and an offset radius 142 of 5 mm allows the fast tool servo 250 to develop a tool tip acceleration in excess of 25 g's following a 5 micron peak to valley sinusoidal surface with 50 nm accuracy at 2 kHz.

Figure 30:
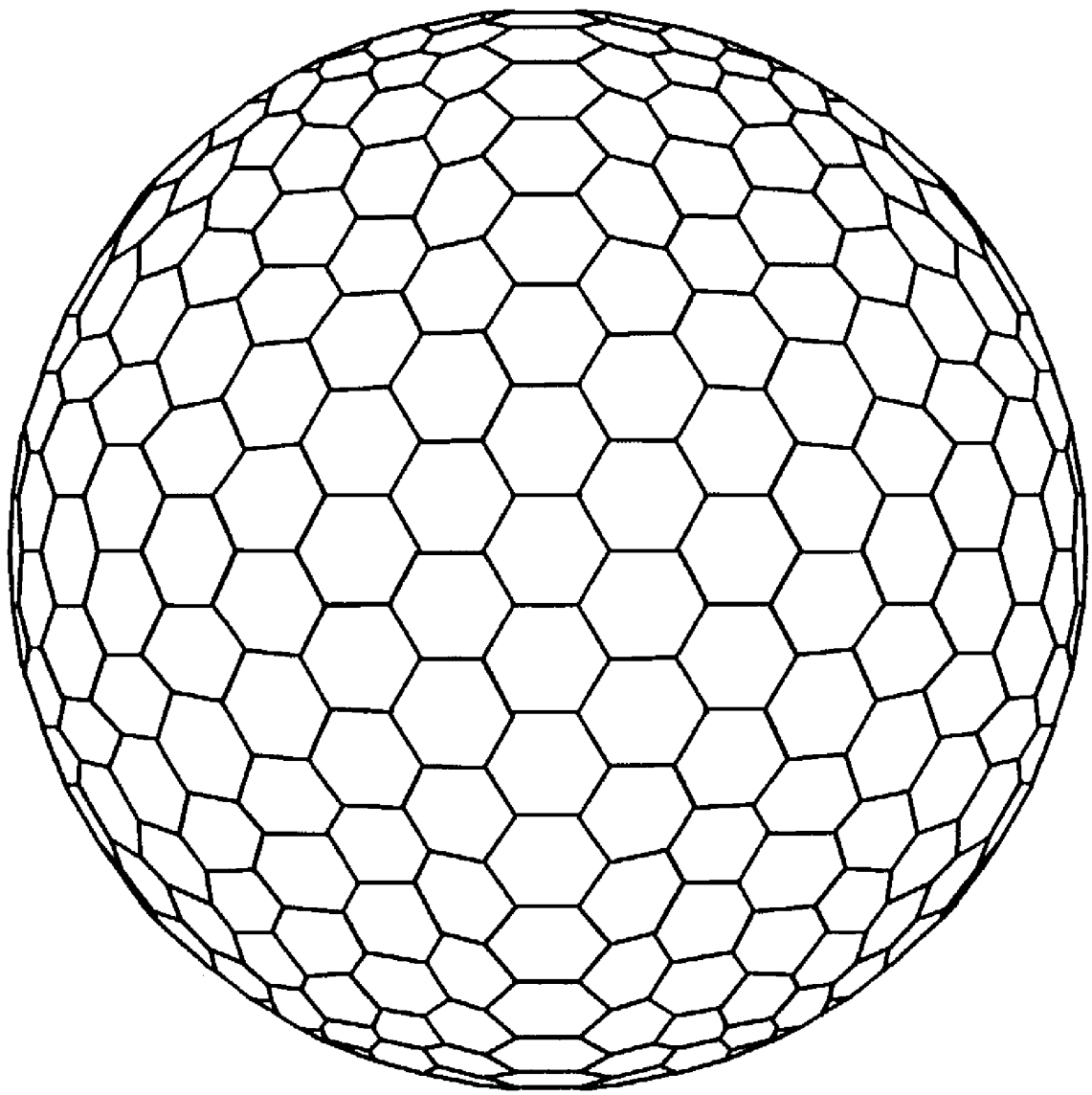
FIG. 30 is a front view of an exemplary workpiece in accordance with a preferred embodiment of the present invention.

The cutting edge 72 on the cutting tool 90 is spaced from the axis of rotation 46, 296 by an offset radius 142 as shown in FIGS. 5 and 24. Rotation of the swing arm 102, 268 caused by the actuator 68 causes a controlled rapid movement of the cutting edge into and out of engagement with the workpiece as the spindle rotates therein, allowing the production of workpieces with complex shapes. For example, referring to FIG. 30, a stasphere shape having a plurality of icosahedron or multiside polyhedron features such as, for example, depressions or dimples with smooth or abrupt transitions between surfaces is produced by the rotation of the workpiece on the spindle as the cutting edge is moved into and out of engagement with the material while the rotating table 242 carries the fast tool servo 40, 250 from the pole of the workpiece to its equator. In addition, the applications of the preferred embodiments include production of lenses for telescopes or ophthalmics.

Figure 32A:
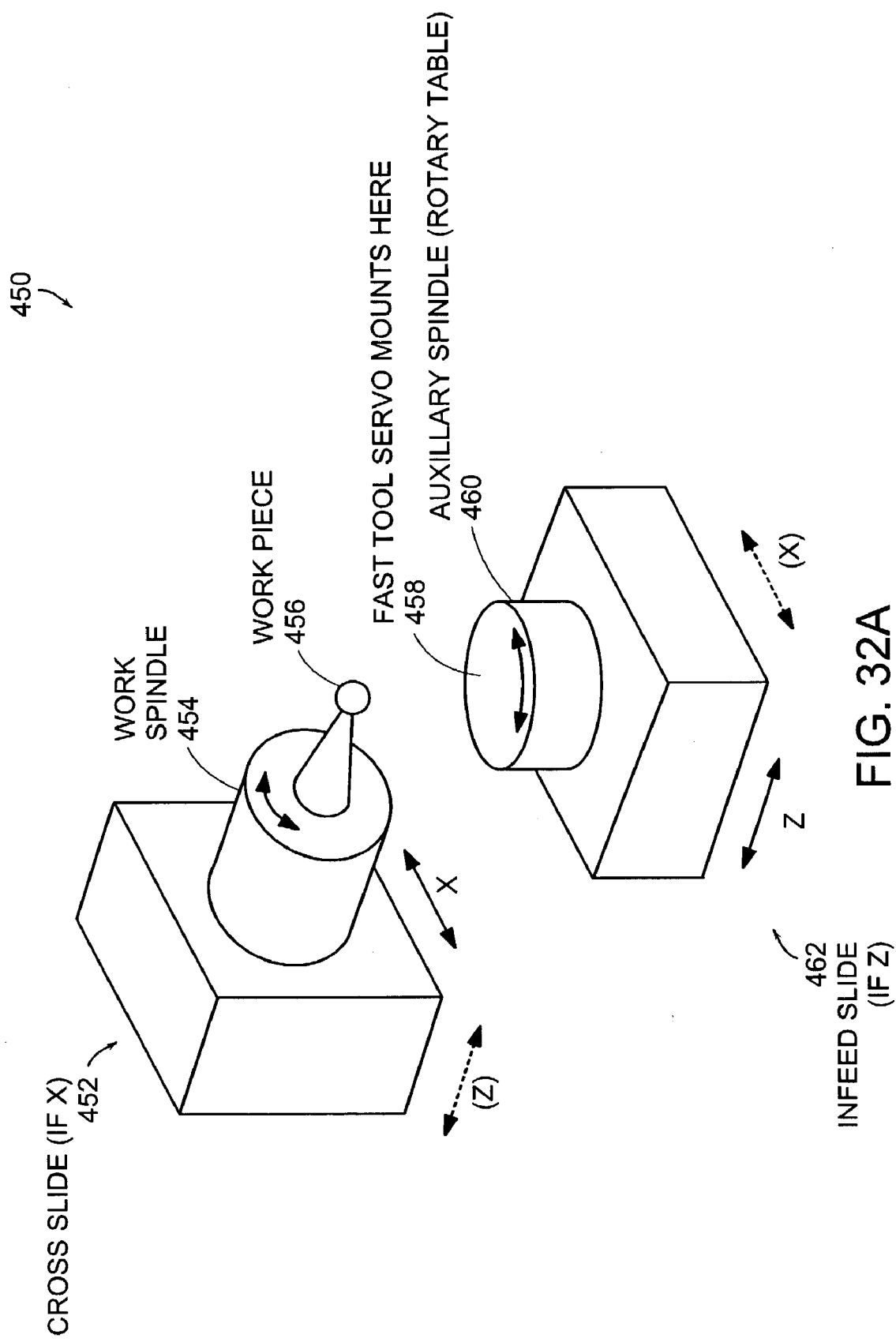
FIG. 32A is a perspective view of a lathe with a workpiece and an auxiliary rotary table without the fast tool servo in accordance with a preferred embodiment of the present invention.
Figure 32B:
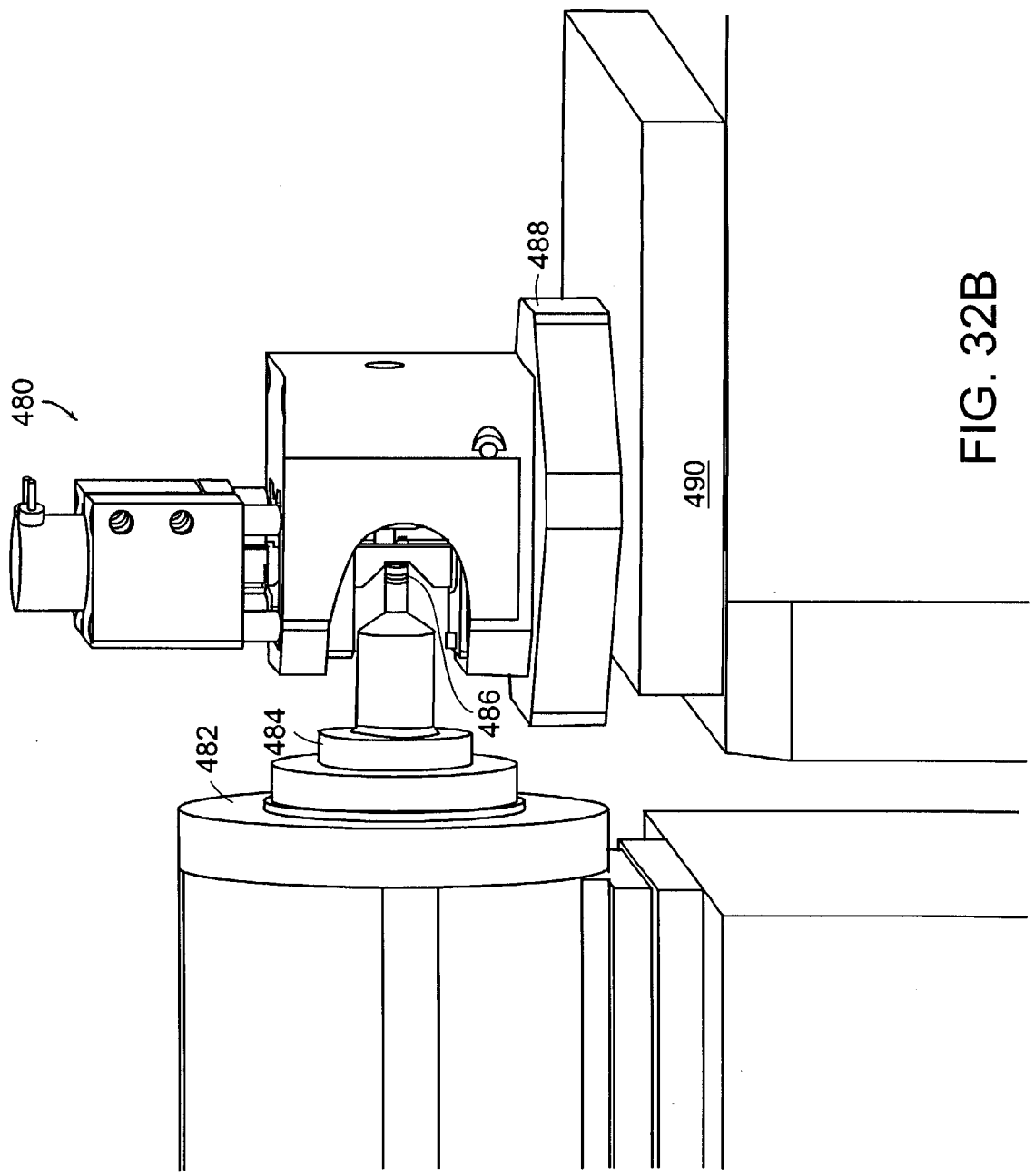
FIGS. 32B and 32C are views illustrating a lathe with a workpiece and a rotary tool servo system in accordance with a preferred embodiment of the present invention.
Figure 32C:
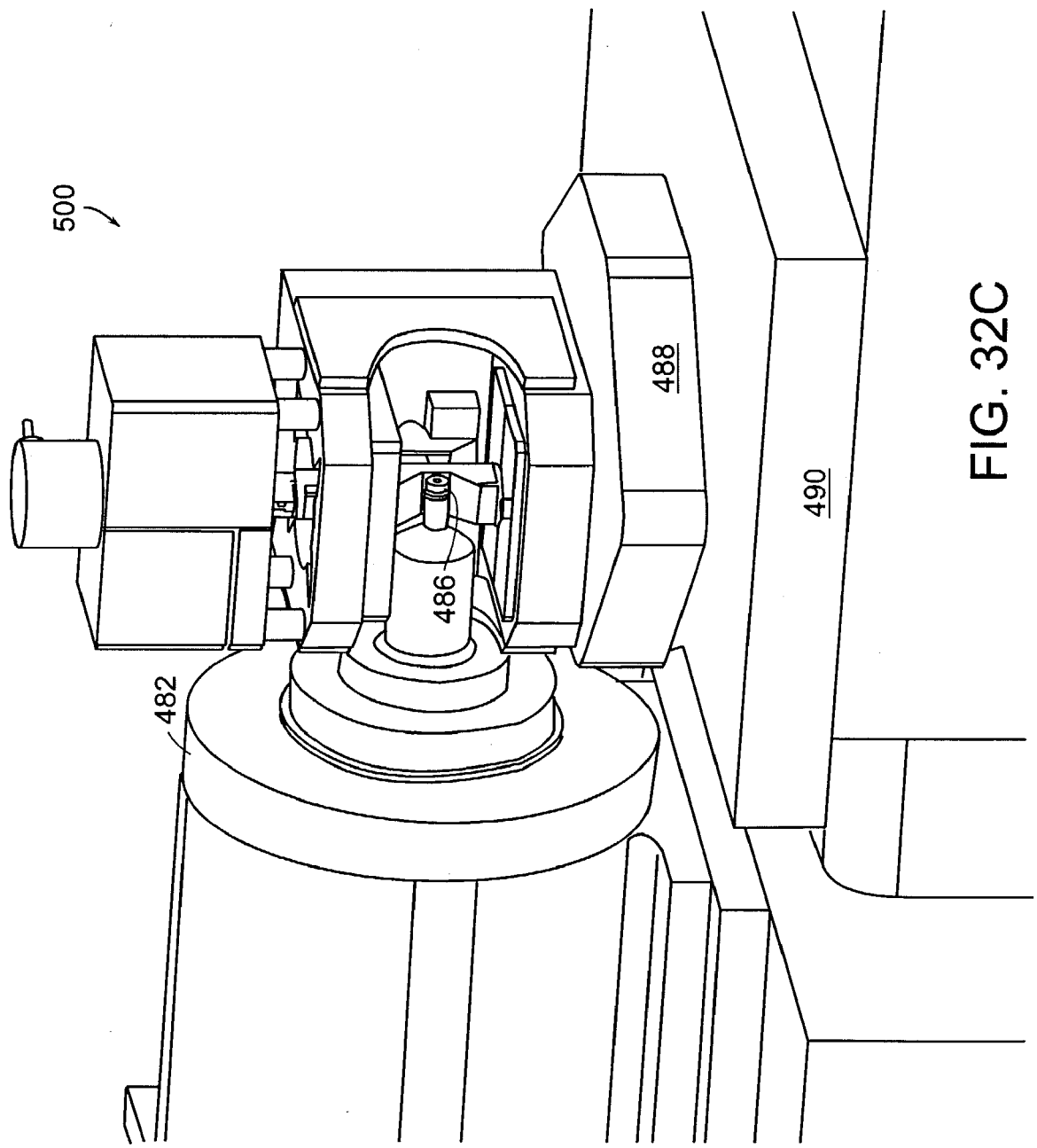

FIGS. 32B and 32C illustrate views of a precision lathe having a workpiece 486 and a fast tool servo system in accordance with a preferred embodiment of the present invention. These figures illustrate enlarged views of the fast tool servo system which is placed on a rotary table 488, in relation to the workpiece 486, the cross-slide 452 and in-feed slide 462 described hereinbefore.

Figure 33B:
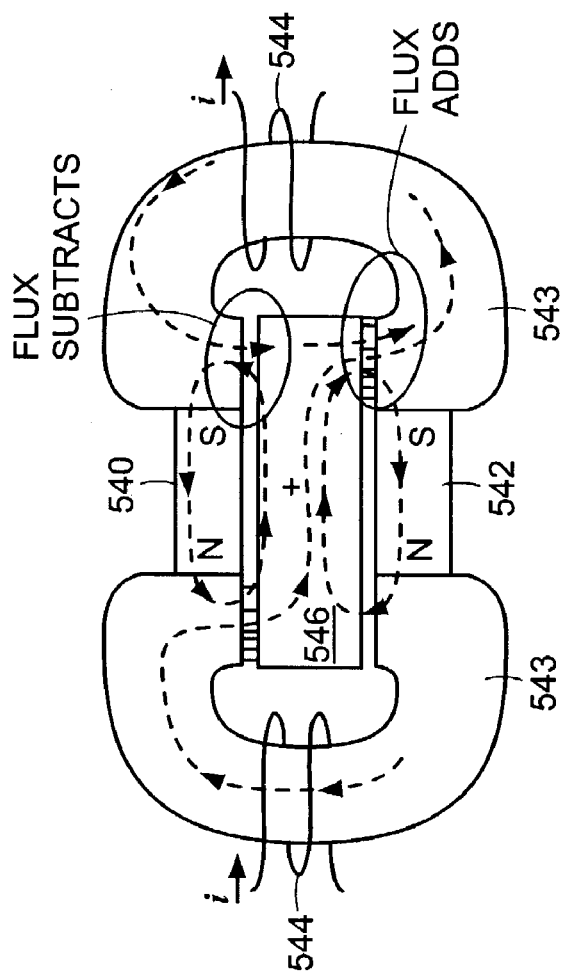
FIGS. 33A and 33B are schematic diagrams of a variable reluctance actuator and swing arm assembly in accordance with a preferred embodiment of the present invention.
Figure 33A:
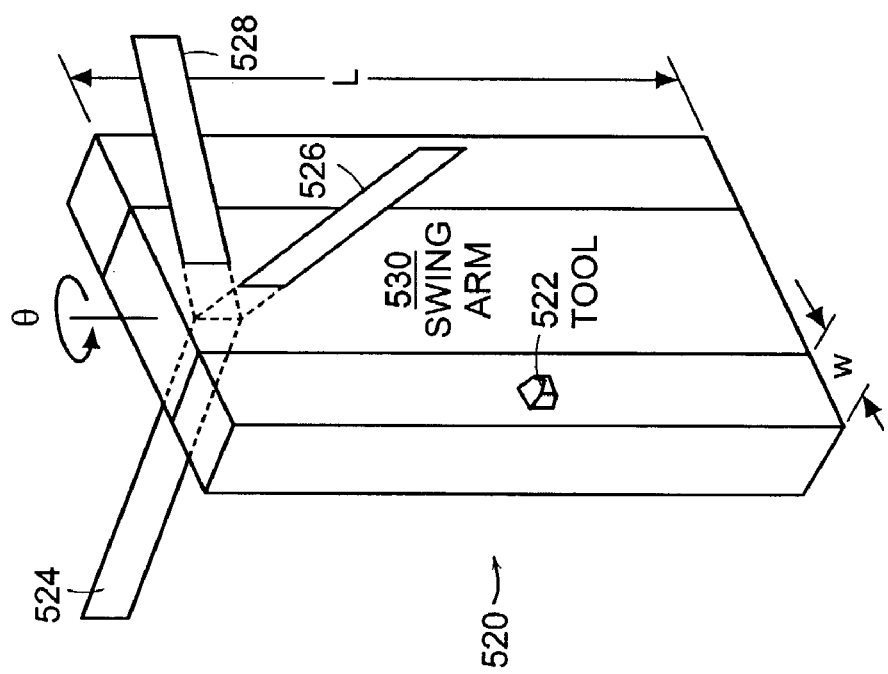

FIGS. 33A and 33B are schematic diagrams of a variable reluctance actuator in accordance with a preferred embodiment of the present invention. In a preferred embodiment the actuator and swing arm are an integral unit. This embodiment includes a normal-direction variable reluctance rotary actuator for an approximately 10 kHz and higher rotary fast tool servo system. Two pairs of actuators provide back and forth rotation of a swing arm 530 that holds a tool 522 at a location spaced from the axis of rotation, creating a tool motion towards and away from a workpiece. In a preferred embodiment, using a flux density of approximately 1.5 Tesla, a 1000 g's of tool acceleration required to follow a 5 micron peak to valley sinusoidal surface at, for example, 10 kHz can be achieved. This alternate preferred embodiment operates using the principle of variable reluctance wherein a force is generated between two components in a magnetic circuit as it naturally attempts to reduce the overall reluctance of the magnetic circuit. In the present embodiment, reducing one or more of the air gaps between the movable rotor 546 and the stator 543 reduces the reluctance of the magnetic circuit. The permanent magnets 540 and 542 provide magnetic flux biasing so that the magnetic flux generated by the current (i) in the coils 544 causes rotation of the rotor 546. For the direction of the current (i) shown in FIG. 33B the magnetic flux generated by the coils 544 is steered by the permanent magnets 540 and 542 from the upper left corner of the rotor 546 to the lower right corner of the rotor causing clockwise rotation of the rotor. Reversing the direction of the current (i) shown in FIG. 33B causes the magnetic flux generated by the coils 544 to be steered by the permanent magnets 540 and 542 from the lower left corner of the rotor 546 to the upper right corner of the rotor causing counter-clockwise rotation of the rotor. A normal-direction variable reluctance actuator is an electromagnet that closes the gap between itself and a target. The attractive force increases with the inverse of the gap squared and can thus provide a small stroke actuator with a high force density. FIG. 33B illustrates stators having windings 544 which can be formed out of various coils. A permanent magnet system 540, 542, is disposed between the stators. A rotor 546 is disposed in the center of the permanent magnets. The system induces a force that provides for the back and forth rotation of the rotating swing arm 530 that holds the tool 522. The geometry of the flexures 524, 526, 528 is optimized to provide the necessary guidance and support of the swing arm. In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the diagrams. While various elements of the preferred embodiments have been described as being implemented in software, other embodiments in hardware or firmware implementations may alternatively be used, and vice-versa.

It will be apparent to those of ordinary skill in the art that methods involved in the rotary fast tool servo system may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

An operating environment for the rotary fast tool servo system can include a processing system with at least one high speed processing unit and a memory system. In accordance with the practices of persons skilled in the art of computer programming, the present invention is described with reference to acts and symbolic representations of operations or instructions that are performed by the processing system, unless indicated otherwise. Such acts and operations or instructions are sometimes referred to as being "computer-executed," or "processing unit executed."

It will be appreciated that the acts and symbolically represented operations or instructions include the manipulation of electrical signals by the processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the processing unit. The computer readable medium includes cooperating or interconnected computer readable media, which exist exclusively on the processing system or is distributed among multiple interconnected processing systems that may be local or remote to the processing system.

It is to be understood that the above-described embodiments are simply illustrative of the principles of the invention. Various and other modifications and changes may be made by those skilled in the art which will embody the principles of the invention and fall within the spirit and scope thereof. The claims should not be read as limited to the described order or elements unless stated to that effect. Therefore, all embodiments that come within the scope and spirit of the following claims and equivalents thereto are claimed as the invention.

What is claimed is:

1. A servo tool device for fabricating a three-dimensional surface, comprising:
   a base;
   a cutting tool;
   a rotatable arm to hold the cutting tool;
   a first flexure attached to the rotatable arm and extending radially from the rotatable arm relative to the base, the first flexure positioned such that rotation of the rotatable arm flexes the first flexure;
   a second flexure attached to the rotatable arm and extending radially from the rotatable arm relative to the base, the second flexure positioned such that rotation of the rotatable arm flexes the second flexure; and
   a third flexure attached to the rotatable arm and extending radially from the rotatable arm relative to the base, and the third flexure positioned such that rotation of the rotatable arm flexes the third flexure.

2. The device of claim 1 further comprising a fourth flexure attached to the rotatable arm and extending radially from the rotatable arm relative to the base, the fourth flexure being co-linear with one of the first, the second, and the third flexure.

3. The device of claim 1 further comprising a fourth flexure attached to the rotatable arm and extending radially from the rotatable arm relative to the base, wherein at least one pair of the flexures being co-linear and formed from a single blade.

4. The device of claim 1 further comprising a second set of flexures having at least three flexures, the second set of flexures extending between the rotatable arm and the base, and wherein the cutting tool is interposed on the rotatable arm between the first, second and third flexure, forming jointly a first set of flexures, and the second set of flexures.

5. The device of claim 4 wherein the first set of flexures and the second set of flexures are positioned at a 45 degree angle from a right/left plane of symmetry in the rotatable arm.

6. The device of claim 4 wherein the rotatable arm further comprises an upper hub having at least one slot to receive at least one flexure from the first set and a lower hub having at least one slot to receive at least one flexure from the second set.

7. The device of claim 6 wherein the at least one flexure from the first set is located in an upper slot and the at least one flexure from the second set is located in a lower slot, both flexures being fixed into their respective slots.

8. The device of claim 6 wherein the at least one flexure from the first set and the at least one flexure from the second set are preloaded in the base in tension.

9. The device of claim 1 wherein the rotatable arm further comprises fixing an inner end of the at least one flexure.

10. The device of claim 1 further comprising a controller.

11. A device of claim 10 wherein the controller comprises a programmable computer.

12. The device of claim 1 wherein the rotatable arm comprises a plurality of slots to receive flexures, the flexures being fixed into their respective slots.

13. The device of claim 1 wherein the base includes a plurality of slots to receive an outer end of the first flexure, an outer end of the second flexure, and an outer end of the third flexure.

14. The device of claim 1 wherein the base further comprises at least one tensioning device to pretension a flexure.

15. The device of claim 1 wherein the base further comprises fixing at least one outer end of the first, the second and the flexures.

16. The device of claim 1 wherein the rotatable arm is adapted to receive the cutting tool, the cutting tool having a pair of coplanar, separated mating surfaces on each side of a right/left plane of symmetry.

17. The device of claim 1 wherein the rotatable arm is driven by an actuator.

18. The device of claim 1 wherein the rotatable arm further comprises at least one hard stop spaced from the rotatable arm to engage the rotatable arm to prevent over rotation of the arm.

19. The device of claim 1 wherein the base further comprises an upper base and a lower base joined by a flexure hinge enabling the upper base to be repositioned with respect to the lower base to reposition the cutting tool in relation to a workpiece.

20. The device of claim 19 wherein the base further comprises a differential screw mounted in the upper base, a tip of the differential screw positioned against the lower base, such that the differential screw controls flexure positioning of the upper base with respect to the lower base.

21. The device of claim 1 wherein the cutting tool is positioned at a fixed radius from an axis of rotation.

22. The device of claim 1 wherein the first, the second and third flexures have an angular separation from each other.

23. A method of machining a part from a workpiece comprising the steps of:
positioning a workpiece on a spindle;
providing a cutting tool carried by a rotatable arm;
supporting the rotatable arm and establishing a rotational axis for the arm with a plurality of flexures wherein both ends of the plurality of flexures are substantially fixed;
rotating the rotatable arm to move the cutting tool into and out of engagement with the workpiece; and
actuating relative movement between the workpiece and the cutting tool to form the part.

24. The method of machining of claim 23 wherein the workpiece is rotating at a speed in excess of 300 revolutions per minute.

25. The method of machining of claim 23 wherein the workpiece is rotating in a range of between 10 and 10,000 revolutions per minute.

26. The method of machining of claim 23 wherein the rotatable arm is rotated by an actuator.

27. The method of machining of claim 26 wherein the actuator moves the rotatable arm at a frequency of at least 1500 Hz.

28. The method of machining of claim 26 wherein the rotation of the actuator is in a range of ±5 degrees, and the cutting tool has a maximum stroke length of 2.5 mm.

29. The method of machining of claim 26 wherein the actuator moves the rotatable arm at a frequency of at least 2000 cycles per second.

30. The method of machining of claim 26 wherein the actuator moves the rotatable arm with a frequency of at least 2000 Hz and a corresponding full stroke length of at least 5 microns.

31. The method of machining of claim 23 wherein at least one of the workpiece and cutting tool are movable relative to each other to form the part.

32. The method of machining of claim 23 wherein both the workpiece and the cutting tool are movable in a plane relative to each other.

33. The method of machining of claim 23 wherein the cutting tool and the workpiece have at least two axes of travel relative to each other.

34. A method of machining a part from a workpiece comprising the steps of:
rotating a workpiece on a spindle of a machine tool;
providing a cutting tool carried by a rotatable arm of a servo tool, the cutting tool offset from rotational axis of the rotatable arm;
supporting the rotatable arm and establishing a rotational axis for the rotatable arm with at least three flexures, each flexure having a first end secured to the rotatable arm and a second end secured to a base of the servo tool;
rotating the rotatable arm by an actuator for moving the cutting tool into and out of engagement with the workpiece to form the part; and
moving the machine tool to position the servo tool and the cutting tool relative to the workpiece.

35. The method of machining of claim 34 further comprising the step of:
providing a rotating table having a rotational axis perpendicular to the rotation axis of the workpiece.

36. The method of machining of claim 34 wherein the step of moving the machine tool to position the servo tool and the cutting tool relative to the workpiece further comprises rotating the rotating table of the machine tool.

37. The method of machining claim 35 wherein the rotational axis of the rotatable arm is not coincident with the rotational axis of the rotating table.

38. The method of machining of claim 34 further comprising the steps of:
sensing the position of the workpiece;
sensing the location of the cutting tool; and
controlling the relative position of the cutting tool to the workpiece.

39. The method machining of claim 38 wherein the step of sensing the location of the cutting tool includes:
measuring the position of a moving member of the actuator; and
sensing the position of the rotatable arm including the rotation about the rotational axis of the rotatable arm.

40. The method of machining of claim 38 wherein the step of controlling the relative position of the cutting tool to the workpiece includes:
controlling the speed and orientation of the workpiece; and
controlling the frequency of motion of the cutting tool and the position of the cutting tool by controlling of the actuator.

41. The method of machining of claim 38 wherein the step of controlling the relative position of the cutting tool to the workpiece comprises controlling the position of the servo tool relative to the workpiece by controlling the position of a first slideway, a second slideway, and a rotating table.

42. A method of controlling relative motion between a workpiece and a cutting tool of a servo tool comprising the steps of:
providing a machine tool with a cross-slide and an in-feed slide;
determining with at least one sensor the rotation of the workpiece positioned on a spindle;
determining with at least one sensor the position of the cross-slide of the machine;
determining with at least one sensor the position of the in-feed slide of the machine;
determining with at least one sensor the position of a cutting edge carried by a rotatable arm of the servo tool relative to the portion of a machine tool that the servo tool is attached to; and
moving the workpiece and the cutting edge of the servo tool relative to each other to form a part.

43. The method of claim 42 further comprising the steps of:
providing a base unit in the machine tool for holding the rotatable spindle;
determining the position of the base unit, the base unit movable in at least one of in-slide or cross-slide directions; and
providing the position of the base unit and the rotation position of the workpiece spindle to a precision lathe controller.

44. The method of claim 43 further comprising the steps of:
providing the machine tool with a rotating table for carrying the servo tool;
determining the position of the rotating table, the rotating table movable in at least one direction in addition to rotating; and
providing the position of the rotating table to the precision lathe controller.

45. The method of claim 42 further comprising the steps of:
determining with at least one sensor the rotation position of the rotatable arm; and
providing the position of the rotatable arm to a servo tool controller.

46. The method of claim 42 further comprising the steps of:
calculating angular velocity of the rotatable arm;
providing additional sensors associated with one of the rotatable arm and the actuator; and
providing information from the additional sensors to the servo tool controller to determine the exact position and the rotation of the rotatable arm.

47. The method of claim 45 wherein the servo tool controller is a master controller and the precision lathe controller is the slave controller.

48. The method of claim 45 further comprising the steps of:
providing the information indicative of the position and velocity of the cross-slide, the in-feed slide, the spindle, and the rotating table to the servo tool controller and to the precision lathe controller.

49. The method of claim 42 further comprising the step of computing the spatial relationship between the workpiece and the cutting edge of the servo tool.

50. The method of claim 45 wherein the step of moving the machine tool with the workpiece spindle and the workpiece and the cutting edge of the servo tool relative to each other comprises providing commands to the servo tool controller to position and orient the cross-slide, the in-feed slide, the spindle, and the rotating table, and providing commands to the precision lathe controller to position the cutting edge.

51. The method of claim 45 wherein the precision lathe controller is the master controller and the servo tool controller is a slave controller.

52. The method of claim 45 wherein the step of moving the machine tool with the workpiece spindle and the workpiece and the cutting edge of the servo tool relative to each other comprises providing commands to the precision lathe controller to position and orient the cross-slide, the in-feed slide, the spindle, and the rotating table, and providing commands to the servo tool controller to position the cutting edge.

53. The method of claim 42 further comprising providing the step of damping the motion of the rotatable arm by dissipating energy associated with rotation of the rotatable arm by one of a viscous fluid, a viscoelastic material or electromagnetic coupling provided between the rotatable arm and the base of the servo tool.

54. The method of claim 53 wherein the movement of the cutting edge of the servo tool is provided by controlled rotation of a member of an actuator.

55. The method of claim 45 wherein the servo tool controller further comprises a programmable computer.

56. A servo tool comprising:
a base having an upper portion and a lower portion; an actuator carried by the base;
a rotatable arm assembly including:
a swing arm extending between the upper portion and the lower portion of the base, the swing arm being connected to the actuator;
a retention mechanism for retaining the swing arm in the upper portion and the lower portion and for limiting rotation motion about a rotational axis; and a cutting tool disposed in the swing arm and spaced from the rotational axis, wherein the retention mechanism further comprises a first set of flexures comprising:
a first flexure attached to the swing arm and extending radially from the swing arm relative to the base, the first flexure positioned such that rotation of the rotatable swing arm flexes the first flexure;
a second flexure attached to the swing arm and extending radially from the swing arm relative to the base, the second flexure positioned such that rotation of the rotatable swing arm flexes the second flexure; and
a third flexure attached to the swing arm and extending radially from the swing arm relative to the base, the third flexure positioned such that rotation of the rotatable swing arm flexes the third flexure.

57. The servo tool of claim 56 wherein the first set of flexures of the retention mechanism further comprises a fourth flexure attached to the swing arm and extending radially from the swing arm relative to the base, the fourth flexure being co-linear with one of the first, the second, and the third flexure.

58. A servo tool comprising:
- a base having an upper portion and a lower portion; an actuator carried by the base;
- a rotatable arm assembly including:
- a swing arm extending between the upper portion and the lower portion of the base, the swing arm being connected to the actuator;
- a retention mechanism for retaining the swing arm in the upper portion and the lower portion and for limiting rotation motion about a rotational axis; and
- a cutting tool disposed in the swing arm and spaced from the rotational axis, wherein the retention mechanism further comprises a second set of flexures including a first flexure, a second flexure, a third flexure, and a fourth flexure, both the first and second sets of flexures extending between the swing arm and the base, the cutting tool interposed on the swing arm between the set of flexures.

59. The servo tool of claim 58 wherein the first set of flexures and the second set of flexures are positioned at a 45 degree angle from a right/left plane of symmetry in the rotatable swing arm.

60. The servo tool of claim 58 wherein the flexures are fixed to the base.

61. The servo tool of claim 58 further comprising at least one tension device, one of the at least one tension device being interposed between one of the flexures and the base for placing the flexures in tension.

62. The servo tool of claim 56 further comprising a stop carried by the base and engageable by the swing arm to limit movement of the swing arm.

63. The servo tool of claim 56 further comprising at least one sensor disposed in the base for determining the rotation of the swing arm, and a controller for receiving data from the at least one sensor for controlling the movement of the actuator.

64. The servo tool of claim 56 further comprising a damping mechanism for dissipating energy associated with unwanted motion of the swing arm.

65. The servo tool of claim 56 further comprising:
- a plurality of thermal insulating spacers for spacing the actuator from the base; and
- an enclosure encircling the actuator for the removal of heat.

66. The servo tool of claim 56 further comprising:
- a pair of side stiffeners extending between an upper portion of the base and a lower portion of the base for stiffening the base; and
- a pair of stiffening plates, each stiffening plate being disposed in a side of the swing arm assembly.

67. A tool for cutting a workpiece comprising: a housing;
a cutting surface;
a holder disposed in the housing being operable by rotational motion about a longitudinal axis, the cutting surface being disposed in the holder such that the surface is spaced from the longitudinal axis; and
an actuator that rotates the holder about the longitudinal axis to move the cutting surface into and out of engagement with the workpiece, the tool further comprising a plurality of flexures for securing the holder to the housing.

68. A tool for cutting a workpiece comprising: a housing;
a cutting surface;
a holder disposed in the housing being operable by rotational motion about a longitudinal axis, the cutting surface being disposed in the holder such that the surface is spaced from the longitudinal axis; and
an actuator that rotates the holder about the longitudinal axis to move the cutting surface into and out of engagement with the workpiece, wherein the tool further comprises a plurality of flexures for securing the holder to the housing, wherein at least three flexures extend radially from and are disposed in a holder, and wherein the planes of the at least three flexures intersect at a line that defines a rotation axis of the holder.

* * * * *